United States Patent
Shimizu et al.

(10) Patent No.: US 7,806,016 B2
(45) Date of Patent: Oct. 5, 2010

(54) WORM GEAR MECHANISM HAVING WORM, TORQUE-TRANSMITTING WORM WHEEL AND AUXILIARY WORM WHEEL AND ELECTRIC POWER STEERING APPARATUS INCLUDING THE SAME

(75) Inventors: Yasuo Shimizu, Wako (JP); Katsuji Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 871 days.

(21) Appl. No.: 11/095,237

(22) Filed: Mar. 29, 2005

(65) Prior Publication Data

US 2005/0235767 A1 Oct. 27, 2005

(30) Foreign Application Priority Data

Apr. 22, 2004 (JP) ............................. 2004-126893

(51) Int. Cl.
*F16H 35/00* (2006.01)
(52) U.S. Cl. ..................... 74/388 PS; 74/425; 74/409; 74/89.14; 74/458
(58) Field of Classification Search ................... 74/440, 74/409, 425, 388 PS, 89.14, 458, 457, 437, 74/724, 439, 443
See application file for complete search history.

(56) References Cited

U.S. PATENT DOCUMENTS 4,047,449 A * 9/1977 Popov ........................ 74/458

6,189,399 B1 * 2/2001 Frohnhaus et al. ............ 74/440
7,007,565 B2 * 3/2006 Allen et al. .................... 74/333
2003/0070866 A1 * 4/2003 Kitami et al. ................ 180/444

FOREIGN PATENT DOCUMENTS

| EP | 1 468 897 | | 10/2004 |
|---|---|---|---|
| GB | 1546785 A | * | 5/1979 |
| JP | 09-137857 | | 5/1997 |
| JP | 2001-355700 | | 12/2001 |
| JP | 2002-03711 | | 2/2002 |
| JP | 2002-37100 | | 2/2002 |

* cited by examiner

*Primary Examiner*—Richard W Ridley
*Assistant Examiner*—Alan B Waits
(74) *Attorney, Agent, or Firm*—Hamre, Schumann, Mueller & Larson, P.C.

(57) ABSTRACT

A worm gear mechanism includes a worm, a torque-transmitting worm wheel meshing with the worm, and an auxiliary worm wheel disposed concentrically with the torque-transmitting worm wheel. The auxiliary worm wheel has a pitch circle diameter set to be greater than a pitch circle diameter of the torque-transmitting worm wheel and hence meshes with the worm in a meshing phase different from that of the torque-transmitting worm wheel. A screw thread provided on the worm actually meshes with teeth of the torque-transmitting worm wheel along a length defined as an actual meshing length. The screw thread has an effective length reduced to be approximately equal to the actual meshing length.

14 Claims, 14 Drawing Sheets

WORM GEAR MECHANISM HAVING WORM, TORQUE-TRANSMITTING WORM WHEEL AND AUXILIARY WORM WHEEL AND ELECTRIC POWER STEERING APPARATUS INCLUDING THE SAME

FIELD OF THE INVENTION

The present invention relates to a worm gear mechanism and an electric power steering apparatus including the worm gear mechanism.

BACKGROUND OF THE INVENTION

Worm gear mechanisms include drive-side worms and torque transmission worm wheels meshing with the worms for transmitting torque from the worms to a load side. Various types of worm gear mechanisms have been developed for eliminating backlashes (as disclosed in, for example, JP-A-2001-355700 and JP-A-2002-37100).

Discussion will be made as to a worm gear mechanism disclosed in JP-A-2001-355700 with reference to FIG. 13A through FIG. 13C hereof. Discussion will be made as to a worm gear mechanism disclosed in JP-A-2002-37100 with reference to FIG. 14A and FIG. 14B hereof.

Referring to FIG. 13A, the worm gear mechanism designated at reference numeral 200 is shown as being connected to an electric motor 201. FIG. 13B shows in cross-section the worm gear mechanism 200. FIG. 13C shows a meshing engagement provided in the worm gear mechanism 200.

As shown in FIG. 13A, the worm gear mechanism 200 includes a drive-side worm 202 connected to the electric motor 201, and a driven side worm wheel 204 meshing with the worm 202 and coupled to an output shaft 203. A worm shaft 205 is connected to an output shaft of the electric motor 201.

The worm wheel 204 includes a hub 206 coupled to the output shaft 203, first and second gears 207, 208 disposed about an outer periphery of the hub 206, and an elastic member 209 elastically interconnecting the first and second gears 207, 208 and an outer peripheral surface of the hub 208, as shown in FIG. 13A through FIG. 13C.

The worm wheel 204 meshing with the worm 202 is divided into the two gears (the first and second gears 207, 208) spaced from each other in a direction in which a rotational axis of the worm wheel 204 extends. The worm wheel 204 is urged by the elastic member 209 in a direction of rotation, with the gears 207, 208 disposed out of phase with each other.

In the worm gear mechanism 200, a tooth 207a of the first gear 207 and a tooth 208a of the second gear 208 which are disposed on opposite sides of a tooth 202a of the worm 202 cooperate with each other to sandwich the tooth 202a therebetween for eliminating a backlash.

As for the worm gear mechanism 200, any tooth 207a or 208a of each gear has a contact surface area, which is below half the entire surface area of the tooth 207a or 208a, for contact with the tooth 202a of the worm 202 because the worm gear mechanism 200 has the halved structure, that is, the two gears 207, 208 spaced from each other in the direction of the extension of the rotational axis of the worm wheel 204. Forward rotation of the worm 202 transmits a torque to the tooth 207a of the first gear 207. Reverse rotation of the worm 202 transmits a torque to the tooth 208a of the second gear 208. When contacting the worm 202, the worm wheel 204 undergoes a maximum contact pressure at a dividing portion (positioned centrally in a left-and-right direction of FIG. 13B) where the first gear 207 is separated from the second gear 208. Therefore, there is left a room for improvement in durability, especially, in abrasion resistance of the worm gear mechanism 200.

The worm gear mechanism disclosed in JP-A-2002-37100 is schematically explained with reference to FIG. 14A and FIG. 14B. FIG. 14A shows the worm gear mechanism designated at 300 and connected to an electric motor 301. FIG. 14B shows in cross-section the worm gear mechanism 300.

The worm gear mechanism 300 shown in FIG. 14A includes a drive-side worm 302 connected to the electric motor 301, and a driven side worm wheel 304 meshing with the worm 302 and coupled to an output shaft 303. The worm 302 is connected to a motor shaft 305 by means of a worm shaft.

As shown in FIG. 14B, the worm wheel 304 includes a tooth 311 having a portion (a shaded portion) meshing with a tooth 302a of the worm 302. Such a portion is called a meshing region 312.

The tooth 311 of the worm wheel 304 has an annular retaining groove 313 formed on one side of the meshing region 312 in a face width direction of the tooth 311. Within the retaining groove 313, there is mounted an O-ring 321 made of rubber. The rubber-made O-ring 321 is flexed slightly by contacting a tooth crest 302b of the worm 302 and applies a pre-load to the meshing portion by an elastic recovering force of the O-ring 321 for eliminating a backlash.

In the worm gear mechanism 300 shown in FIG. 14B, the tooth 311 does not have any retaining groove other than the retaining groove 313 formed at the one side of the meshing region 312 in the face width direction (the left-and-right direction of FIG. 14B) of the tooth 311. Thus, the one side of the meshing region 312 in the face width direction differs from the opposite side of the meshing region 312 in flexural rigidity in a tooth thickness direction. Accordingly, the one side of the meshing region 312 in the face width direction differs from the opposite side of the meshing region 312 in contact pressure applied from the worm 302, and hence there is left a room for improvement in durability of the worm gear mechanism 300.

Additionally, a friction force is produced by a contact between the tooth crest 302b of the rotational worm 302 and the rubber-made O-ring 321. The rubber-made O-ring 321 has its relatively large radius which is a distance between a contact surface of the O-ring 321 and a center on which the worm wheel 304 rotates, due to which a large friction torque is produced. For an increased torque transmission efficiency of the worm gear mechanism 300, it is preferable to reduce such a large friction torque.

Moreover, with a frequent contact between the tooth crest 302b and the rubber-made O-ring 321 being taken into consideration, there is a room for improvement in durability of the O-ring 321.

There is a demand for a worm gear mechanism having an improved durability and providing a satisfactory meshing engagement between a worm and a worm wheel in addition to reducing or suppressing a strike sound between a tooth of the worm and a tooth of the worm wheel.

SUMMARY OF THE INVENTION

According to a first aspect of the present invention, there is provided a worm gear mechanism comprising: a drive-side worm; a torque-transmitting worm wheel meshing with the worm for transmitting a torque from the worm to a load side; and an auxiliary worm wheel disposed concentrically with the torque-transmitting worm wheel, wherein the auxiliary worm wheel has a pitch circle having a diameter set to be greater than a diameter of a pitch circle of the torque-transmitting worm wheel, the auxiliary worm wheel meshing with the worm, the worm having a screw thread provided thereon, the screw thread actually meshing with teeth of the torque-transmitting worm wheel along a length defined as an actual meshing length of the entire length of the screw thread, the screw thread having an effective length set to be approximately equal to the actual meshing length.

The term "effective length" used herein represents a range in which the worm meshes with the auxiliary worm wheel with their respective teeth faces contacting with each other at appropriate angles.

Since the diameter of the pitch circle of the auxiliary worm wheel is set to be greater than the diameter of the pitch circle of the torque-transmitting worm wheel, the auxiliary worm wheel can mesh with the worm in a meshing phase different from that of the torque-transmitting worm wheel. With this arrangement, a face width of each tooth of the torque-transmitting worm wheel can be set to be sufficiently large for providing a sufficient contact area of each tooth of the torque-transmitting worm wheel to contact a tooth of the worm. Therefore, durability of the worm gear mechanism having any backlash eliminated can be increased.

The torque-transmitting worm wheel and the auxiliary worm wheel mesh with the worm with the tooth of the worm sandwiched between the teeth of the torque-transmitting worm wheel and teeth of the auxiliary worm wheel. With this arrangement, no backlash is formed and hence production of strike sound between the tooth of the worm and the teeth of the torque-transmitting worm wheel is suppressed.

When the worm is viewed in an axial direction, each tooth of the torque-transmitting worm wheel has a meshing portion located centrally in a face width direction of the tooth for meshing with the worm. Moreover, it becomes possible to integrally form the torque-transmitting worm wheel without providing each tooth of the torque-transmitting worm wheel with any retention groove for retaining backlash-eliminating components as found in the prior art. Thus, the teeth of the torque-transmitting worm wheel can be worked with increased precision with the result that the torque-transmitting worm wheel can maintain a satisfactory meshing engagement with the worm.

In the present invention, the auxiliary worm wheel meshes with the worm in a meshing phase different from that of the torque-transmitting worm wheel because the diameter of the pitch circle of the auxiliary worm wheel is set to be greater than the diameter of the pitch circle of the torque-transmitting worm wheel.

In the present invention, moreover, the entire length of the screw thread provided on the worm includes the actual meshing length along which the screw thread actually meshes with the teeth of the torque-transmitting worm wheel. The effective length of the screw thread is set to be approximately equal to the actual meshing length. By virtue of such a small effective length, while revolving together with the rotational movement of the torque-transmitting worm wheel, the teeth of the auxiliary worm wheel mesh with the screw thread in such a small area as not to interfere with the other teeth. More specifically, in this small area where the teeth of the auxiliary worm wheel mesh with the screw thread, the tooth face of each of the teeth of the auxiliary worm wheel contacts the tooth face of the screw thread at a proper angle. Consequently, the teeth of the auxiliary worm wheel can smoothly mesh with the screw thread without any interference of the other teeth, with the result that a frictional resistance between the teeth of the auxiliary worm wheel and the screw thread can be reduced. Use of the worm gear mechanism in a vehicle steering apparatus provides an advantage that the steering apparatus provides an improved steering feeling.

According to a second aspect of the present invention, there is provided a worm gear mechanism comprising: a drive-side worm; a torque-transmitting worm wheel meshing with the worm for transmitting a torque from the worm to a load side; and an auxiliary worm wheel disposed concentrically with the torque-transmitting worm wheel, wherein the auxiliary worm wheel has a pitch circle having a diameter set to be greater than a diameter of a pitch circle of the torque-transmitting worm wheel, the auxiliary worm wheel meshing with the worm, the worm having a screw thread provided thereon, the screw thread having greater pitches at portions of the screw thread not meshing with teeth of the torque-transmitting worm wheel than a pitch at a portion of the screw thread actually meshing with the teeth of the torque-transmitting worm wheel.

By setting the large pitches of the portions of the screw thread which do not actually mesh with the teeth of the torque-transmitting worm wheel, the portions of the screw thread which do not mesh with the teeth of the torque-transmitting worm wheel do not mesh with the teeth of the auxiliary worm wheel, either.

With this arrangement, while revolving together with the rotational movement of the torque-transmitting worm wheel, the teeth of the auxiliary worm wheel mesh with the screw thread in such a small area as not to interfere with the other teeth. More specifically, in this small area where the teeth of the auxiliary worm wheel mesh with the screw thread, the tooth face of each of the teeth of the auxiliary worm wheel contacts the tooth face of the screw thread at a proper angle. Consequently, the teeth of the auxiliary worm wheel can smoothly mesh with the screw thread without any interference of the other teeth, with the result that a frictional resistance between the teeth of the auxiliary worm wheel and the screw thread can be reduced. Moreover, because the screw thread is formed throughout the length of the worm, the worm has increased flexural rigidity for satisfactory meshing engagement with the torque-transmitting worm wheel.

According to a third aspect of the present invention, there is provided an electric power steering apparatus comprising: a worm gear mechanism; a steering system from a vehicular steering wheel to steered wheels; an electric motor for producing a torque to be transmitted via the worm gear mechanism to the steering system; the worm gear mechanism including: a drive-side worm; a torque-transmitting worm wheel meshing with the worm for transmitting a torque from the worm to a load side; and an auxiliary worm wheel disposed concentrically with the torque-transmitting worm wheel, wherein the auxiliary worm wheel has a pitch circle having a diameter set to be greater than a diameter of a pitch circle of the torque-transmitting worm wheel, the auxiliary worm wheel meshing with the worm, the worm having a screw thread provided thereon, the screw thread actually meshing with teeth of the torque-transmitting worm wheel along a length defined as an actual meshing length of the entire length of the screw thread, the screw thread having an effective length set to be approximately equal to the actual meshing length.

According to a fourth aspect of the present invention, there is provided an electric power steering apparatus comprising: a worm gear mechanism; a steering system from a vehicular steering wheel to steered wheels; an electric motor for producing a torque to be transmitted via the worm gear mechanism to the steering system; the worm gear mechanism including: a drive-side worm; a torque-transmitting worm wheel meshing with the worm for transmitting a torque from the worm to a load side; and an auxiliary worm wheel disposed concentrically with the torque-transmitting worm wheel, wherein the auxiliary worm wheel has a pitch circle having a diameter set to be greater than a diameter of a pitch circle of the torque-transmitting worm wheel, the auxiliary worm wheel meshing with the worm, the worm having a screw thread provided thereon, the screw thread having greater pitches at portions of the screw thread not meshing with teeth of the torque-transmitting worm wheel than a pitch at a portion of the screw thread actually meshing with the teeth of the torque-transmitting worm wheel.

It is preferable for the electric power steering apparatus to employ the above-mentioned worm gear mechanism as a motive power transmission mechanism for transmitting to the steering system a torque produced by the electric motor because the worm gear mechanism having any backlash eliminated provides an improved durability. Since the worm gear mechanism has any backlash removed, strike sound between the screw thread and the teeth of the torque-transmitting worm wheel and the auxiliary worm wheel is reduced or prevented from being emitted when a steering wheel is steered. Use of the thus arranged electric power steering apparatus decreases noise within a passenger compartment of a vehicle.

Because the worm gear mechanism has any backlash removed, a satisfactory meshing engagement between the worm and the torque-transmitting worm wheel can be maintained. It becomes possible to prevent any delay of transmission of an assist torque from the worm gear mechanism to the steering system when a quick turn is made to the steering wheel.

Further, elimination of any backlash is advantageous in that when the torque-transmitting worm wheel is rotated by the worm, the teeth of the torque-transmitting worm wheel not sharply but gently strike the tooth of the worm into meshing engagement with the tooth of the worm, so that the steering wheel can be satisfactorily turned back. Also, when one of the teeth of the auxiliary worm wheel meshes with the screw thread of the worm, the other teeth are prevented from interfering with the screw thread. Thus, each tooth of the auxiliary worm wheel smoothly meshes with the screw thread of the worm. This results in a reduced frictional resistance produced by the meshing engagement.

The electric power steering apparatus including the above worm gear mechanism provides an improved steering feeling.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Exemplary worm gear mechanisms included in an electric power steering apparatus for a vehicle will be explained hereinafter.

Figure 1:
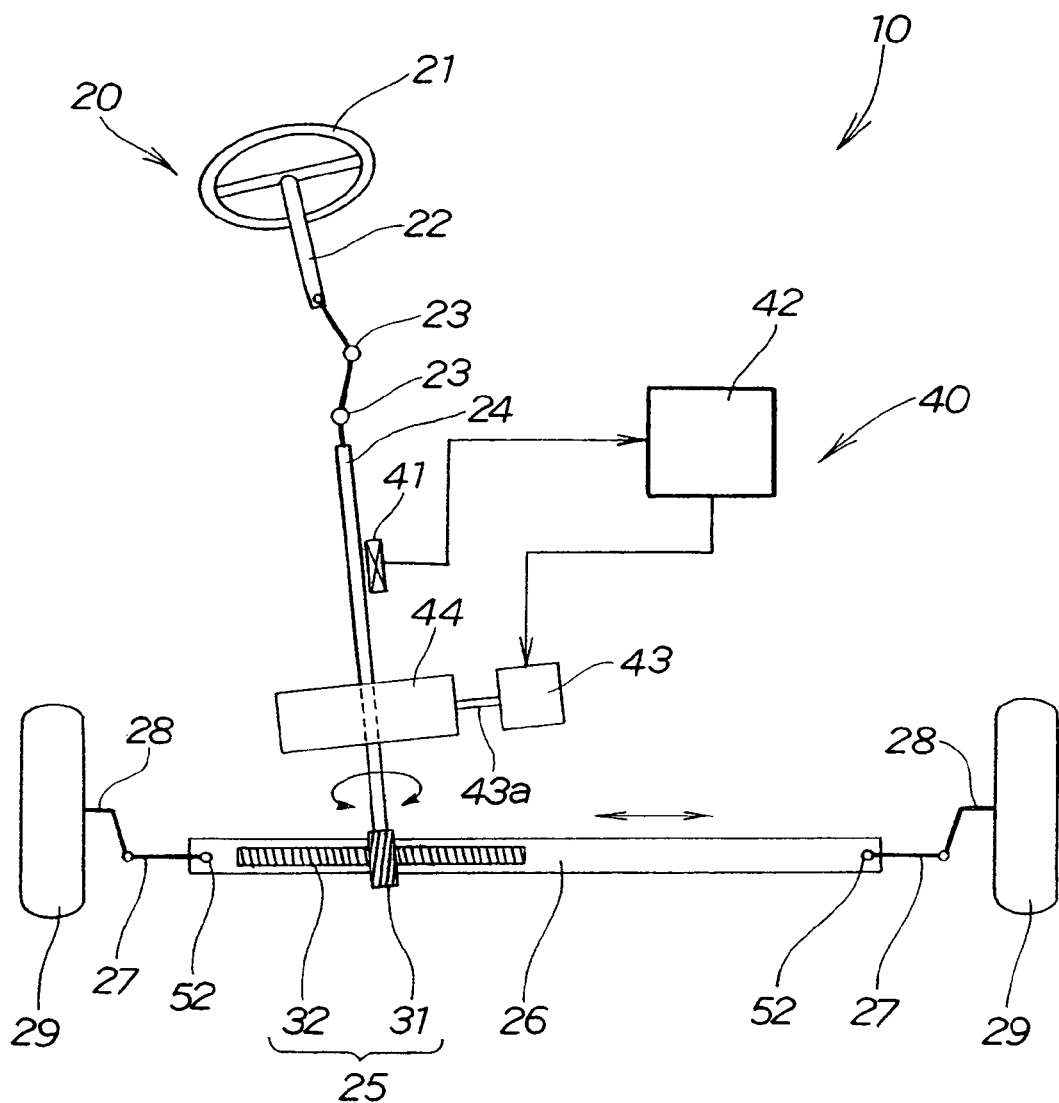
FIG. 1 is a diagrammatical view showing an electric power steering apparatus according to the present invention.

An electric power steering apparatus 10 shown in FIG. 1 comprises a steering system 20 from a vehicular steering wheel 21 to left and right steered wheels (front wheels) 29, 29, and an assist torque mechanism 40 for applying an assist torque to the steering system 20.

The steering system 20 includes a pinion shaft (an input shaft) 24 connected via a steering shaft 22 and universal joints 23, 23 to the steering wheel 21, a rack shaft 26 connected via a rack and pinion mechanism 25 to the pinion shaft 24 and the left and right steered wheels 29, 29 connected to opposite ends of the rack shaft 26 via left and right tie rods 27, 27 and left and right knuckle arms 28, 28.

The rack and pinion mechanism 25 has a pinion 31 formed on the pinion shaft 24 and a rack 32 formed on the rack shaft 26.

When a driver steers the steering wheel 21 by applying a steering torque to the same, the left and right steered wheels 29, 29 are steered by the steering torque via the rack and pinion mechanism 25 and the left and right tie rods 27, 27.

The assist torque mechanism 40 includes a steering torque sensor 41 for detecting the steering torque applied to the steering wheel 21, a control unit 42 for producing a control signal on the basis of a torque detection signal from the steering torque sensor 41, an electric motor 43 for producing, on the basis of the control signal, an assist torque corresponding to the steering torque, and a worm gear mechanism 44 for transmitting the assist torque to the rack and pinion mechanism 25 through the pinion shaft 24.

The composite torque obtained by combination of the assist torque produced by the electric motor 43 and the steering torque produced by the driver steering the steering wheel 21 steers the left and right steered wheels 29, 29 by means of the rack shaft 26.

Figure 2:
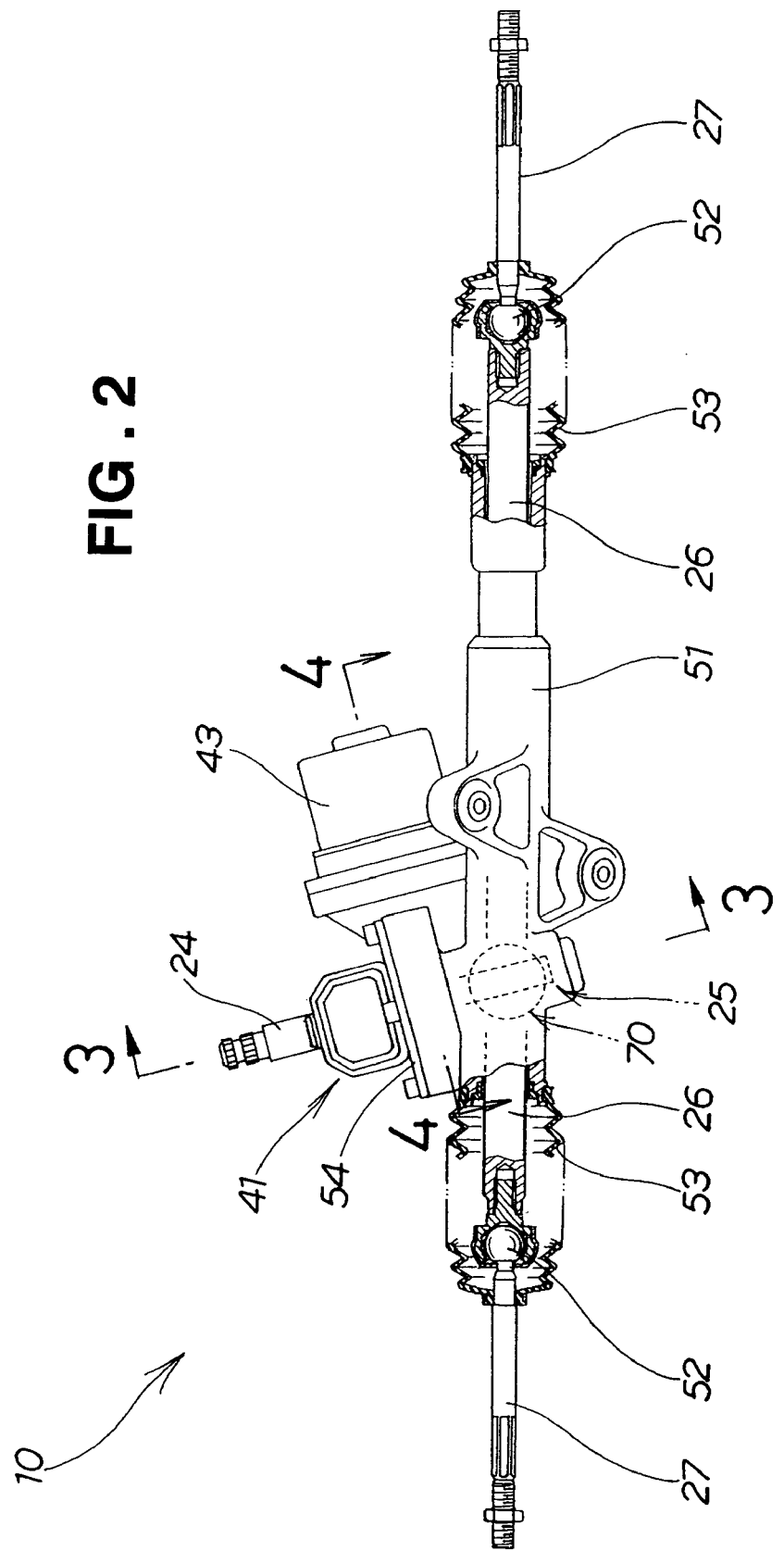
FIG. 2 is a view showing the overall arrangement of the electric power steering apparatus shown in FIG. 1.

Referring to FIG. 2, the rack shaft 26 is axially slidably housed in a housing 51 extending in a vehicle width direction (a left-and-right direction of FIG. 2). The rack shaft 26 has longitudinally opposite ends projecting out of the housing 51. Each end of the rack shaft 26 is connected to the tie rod 27 via a corresponding ball joint 52. Reference numerals 53, 53 denote boots provide dust seals.

Figure 3:
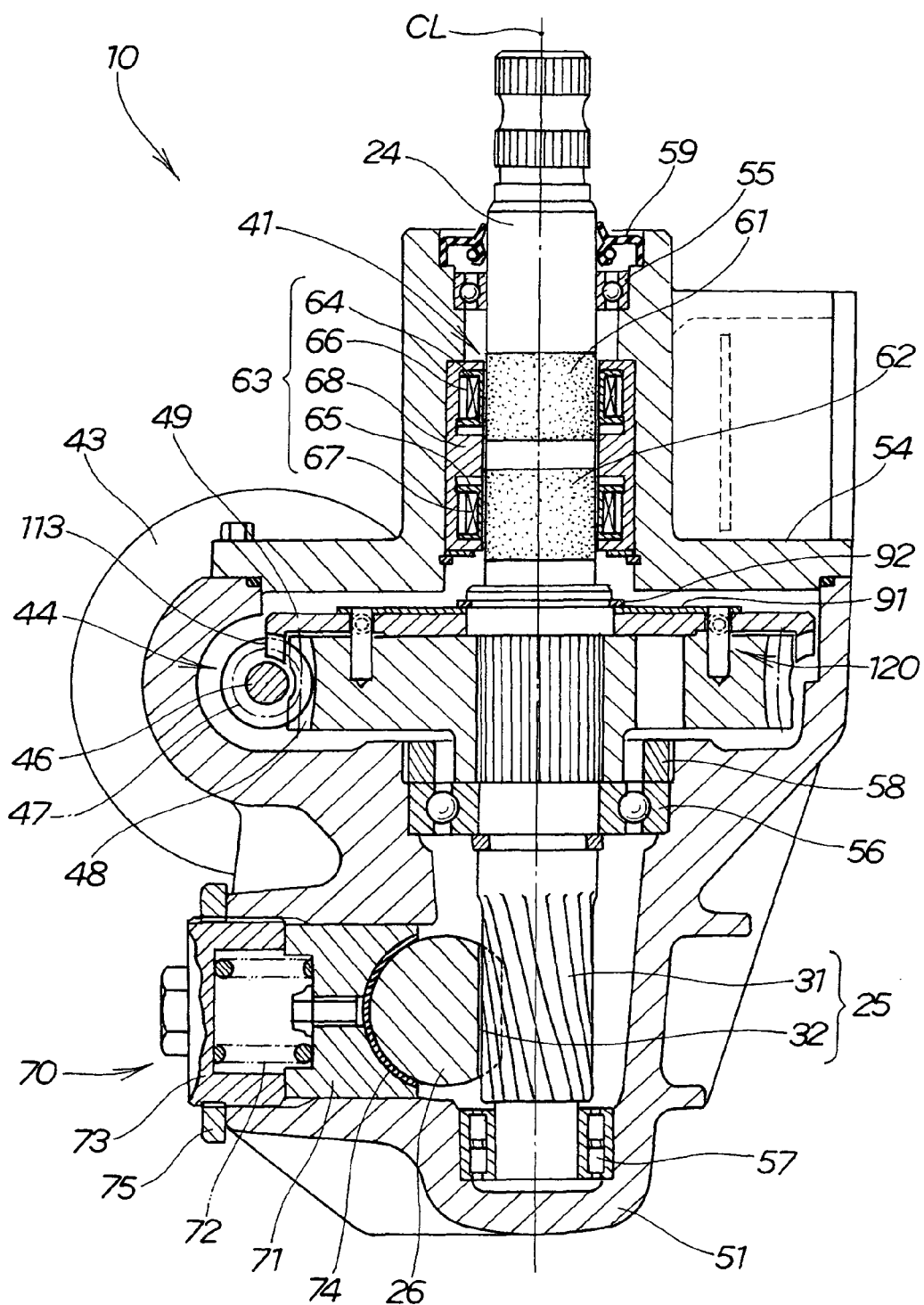
FIG. 3 is a cross-sectional view taken along line 3-3 of FIG. 2.

FIG. 3 is a cross-sectional view of the electric power steering apparatus 10.

The pinion shaft 24, the rack and pinion mechanism 25, the steering torque sensor 41 and the worm gear mechanism 44 are housed in the housing 51. The housing 51 is closed at its upper opening by an upper cover part 54. The steering torque sensor 41 is attached to the upper cover part 54.

The worm gear mechanism 44 includes a drive-side worm 47 and a torque-transmitting worm wheel 48 meshing with the drive-side worm 47 for transmitting a torque from the worm 47 to a load side. The worm gear mechanism 44 further includes an auxiliary worm wheel 49 having the same rotational center CL as the torque-transmitting worm wheel 48. The auxiliary worm wheel 49 is disposed concentrically with the torque-transmitting worm wheel 48 in such a manner as to rotate relative to the worm wheel 48 on the same rotational center CL. The auxiliary worm wheel 49 meshes with the worm 47.

The rotational center CL is a center of the pinion shaft 24. The auxiliary worm wheel 49 is an auxiliary toothed wheel provided for eliminating any backlash between the worm 47 and the torque-transmitting worm wheel 48.

The pinion shaft 24 extends in an up-and-down direction and has an upper portion, a longitudinally center and a lower end rotatably supported by the housing through three bearings 55, 56, 57, respectively. The electric motor 43 and a rack guide 70 are attached to the housing 51. Reference numerals 58, 59 denote a lock nut and an oil seal.

The steering torque sensor 41 is a magnetostrictive, type torque sensor. The pinion shaft 24 has first and second residual distortion portions 61, 62 each of which has a residual distortion applied thereto and has a magnetostriction characteristic varying in correspondence to a torque acting on the pinion shaft 24. Provided around the first and second residual distortion portions 61, 62 is a detecting unit 63 for detecting the torque acting on the pinion shaft 24 by electrically detecting magnetostriction effect occurring on the first and second residual distortion portions 61, 62. The detecting unit 63 outputs a torque detection signal indicative of the detected torque.

The first and second residual distortion portions 61, 62 include magnetostrictive films having residual distortions applied thereto in a longitudinal direction of an axis of the pinion 24. The direction of the residual distortion applied to the first residual distortion portion 61 is opposite the direction of the residual distortion applied to the second residual distortion portion 62.

The detecting unit 63 includes tubular coil bobbins 64, 65 through which the pinion shaft 24 extends, first and second multi-layered solenoids 66, 67 disposed around the coil bobbins 64, 65, respectively, and a magnetic shield back yoke 68 surrounding the first and second multi-layered solenoids 66, 67.

The rack guide 70 is a pressing means including a guide part 71 abutting on the rack shaft 26 from a side opposite the rack 32, and an adjustment bolt 73 forcing the guide part 71 via a compression spring 72. Between the guide part 71 and the adjustment bolt 73, there is provided a slight gap in a direction of adjustment of the adjustment bolt 73. The guide part 71 has an abutment member 74 disposed in abutment on a back surface of the rack shaft 26. The rack shaft 26 is slidable relative to the abutment member 74. Reference numeral 75 denotes a lock nut.

The rack shaft 26 is axially slidably supported by the rack guide 70. The adjustment bolt 73 is screwed into the housing 51 to push the guide part 71 with an appropriate pushing force via the compression spring 72, such that the guide part 71 applies a pre-load to the rack 32 for forcing the rack 32 against the pinion 31. This arrangement provides no backlash between the rack 32 and the pinion 31.

Figure 4:
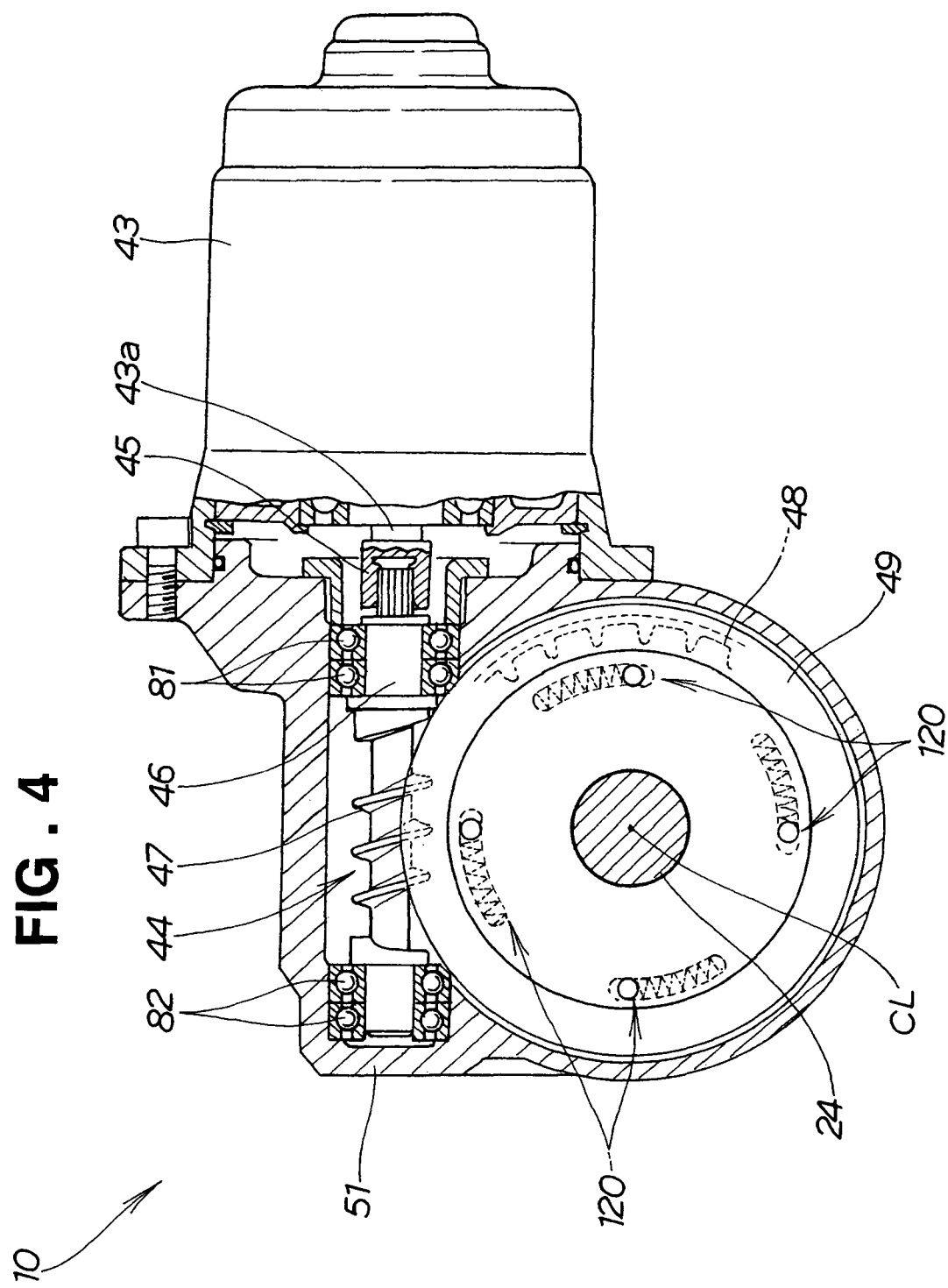
FIG. 4 is a cross-sectional view taken along line 4-4 of FIG. 2.

FIG. 4 shows a relation between the pinion shaft 24, the electric motor 43 and the worm gear mechanism 44.

The electric motor 43 is attached to the housing 51 with a motor shaft 43a disposed horizontally. The motor shaft 43a extends into the housing 51.

The worm gear mechanism 44 is an assist torque transmitting mechanism, that is, an assistor mechanism for transmitting to the pinion shaft 24 an assist torque generated by the electric motor 43.

More specifically, the worm gear mechanism 44 includes a worm shaft 46 connected via a coupling 45 to the motor shaft 43a of the electric motor 43, the worm 47 formed integrally with the worm shaft 46, and the torque-transmitting worm wheel 48 meshing with the worm 47. The torque-transmitting worm wheel 48 is coupled to the pinion shaft 24.

The worm shaft 46 extending horizontally has opposite end portions rotatably mounted within the housing 51 by means of bearings 81, 82.

Figure 5:
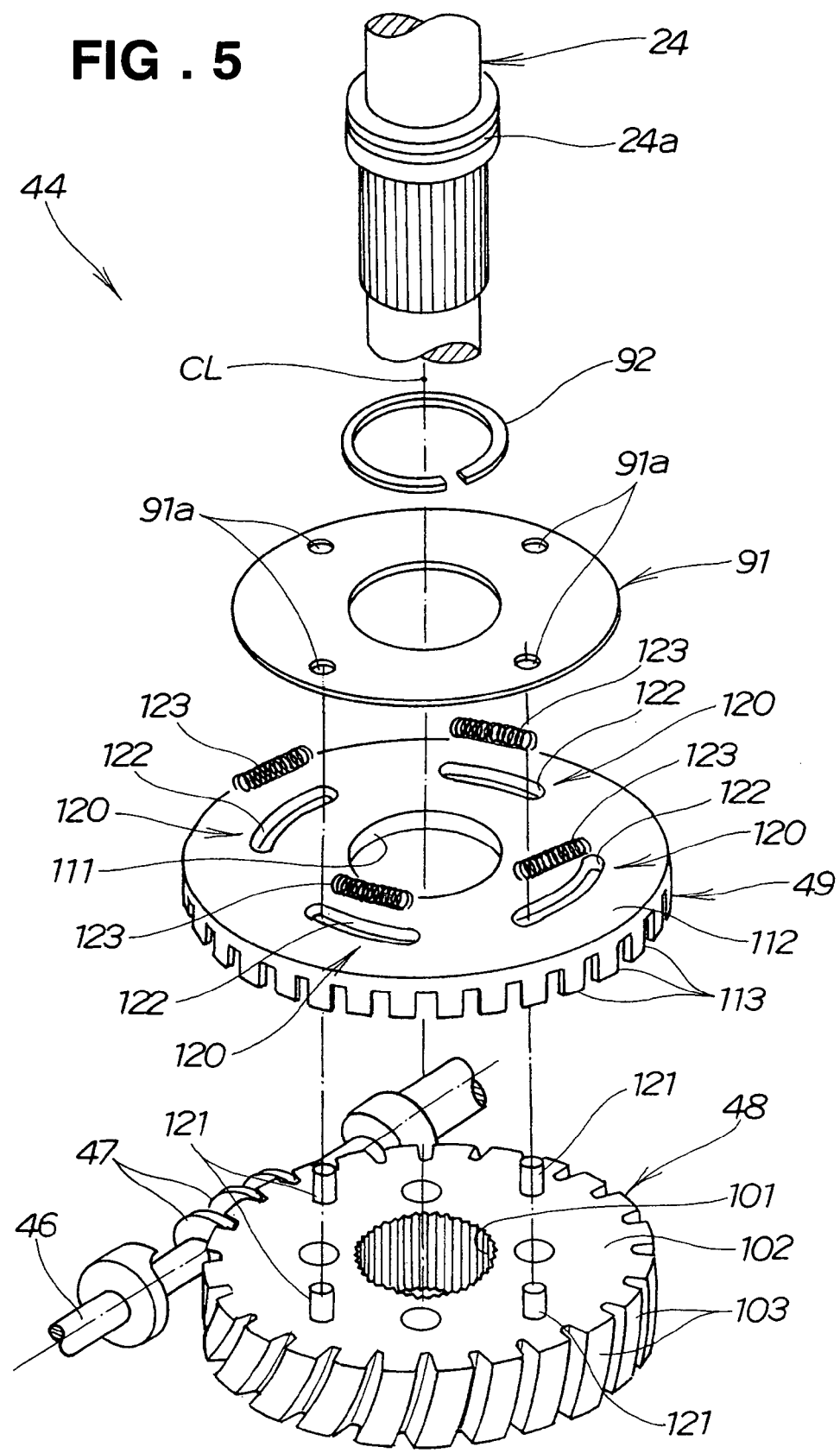
FIG. 5 is an exploded perspective view of a worm gear mechanism according to one embodiment of the present invention.

FIG. 5 shows the worm gear mechanism 44 as disassembled. Referring to FIG. 3 and FIG. 5, the torque-transmitting worm wheel 48 is coupled to the pinion shaft 24 in such a manner as not to undergo axial movement. The auxiliary worm wheel 49 is rotatably mounted about the pinion shaft 24 and lies over the torque-transmitting worm wheel 48. A holding plate 91 lies over the auxiliary worm wheel 49. The pinion shaft 24 has a stop groove 24a formed at a portion thereof located above the holding plate 91. A stop ring 92 is fitted in the stop groove 24a. By virtue of the torque-transmitting worm wheel 48 and the stop ring 92 thus arranged, the auxiliary worm wheel 49 and the holding plate 91 are prevented from moving axially.

The torque-transmitting worm wheel 48 is a toothed wheel including a disc-shaped wheel body 102 having a fitting hole 101, and a plurality of teeth 103 formed integrally with an outer peripheral surface of the wheel body 102. The wheel body 102 has an inner peripheral surface defining the fitting hole 101 and having serration grooves formed thereon for coupling to the pinion shaft 24.

The auxiliary worm wheel 49 is a crown-shaped (or cap-shaped) toothed wheel including a disc-shaped wheel body 112 having a fitting hole 111, and a plurality of teeth 113 formed integrally with an outer peripheral surface of the wheel body 112 and extending towards the torque-transmitting worm gear 48.

The worm gear mechanism 44 includes plural (for example, four) phase holding mechanisms 120 for maintaining a different phase (a different circumferential position) of the auxiliary worm wheel 49 from a phase of the torque-transmitting worm wheel 48.

Figure 6A:
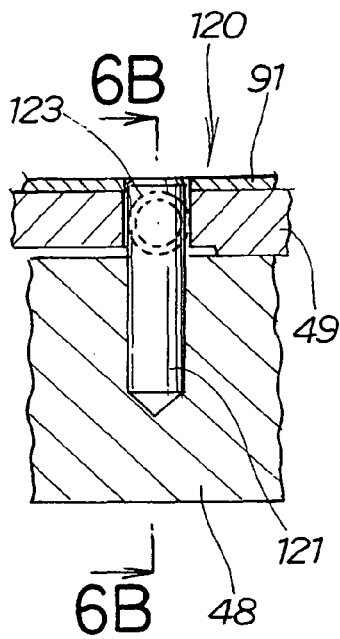
FIG. 6A through FIG. 6D show arrangements of a phase holding mechanism in the worm gear mechanism shown in FIG. 5.
Figure 6B:
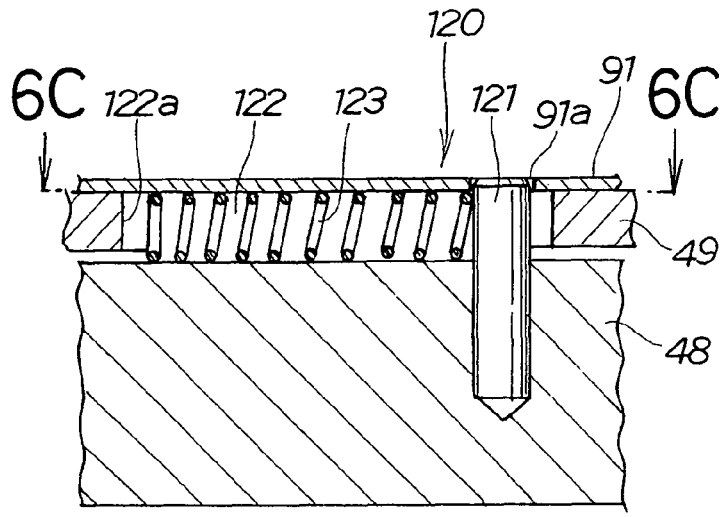
Figure 6C:
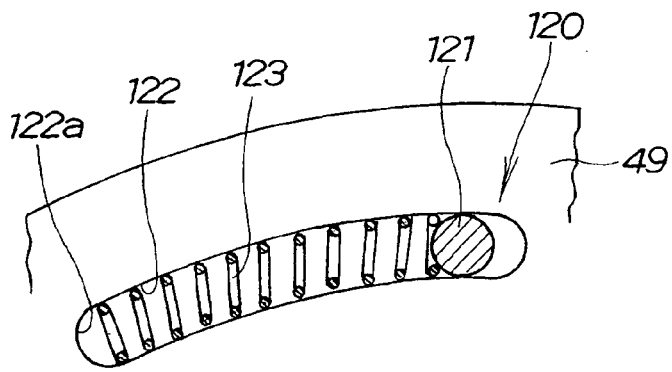
Figure 6D:
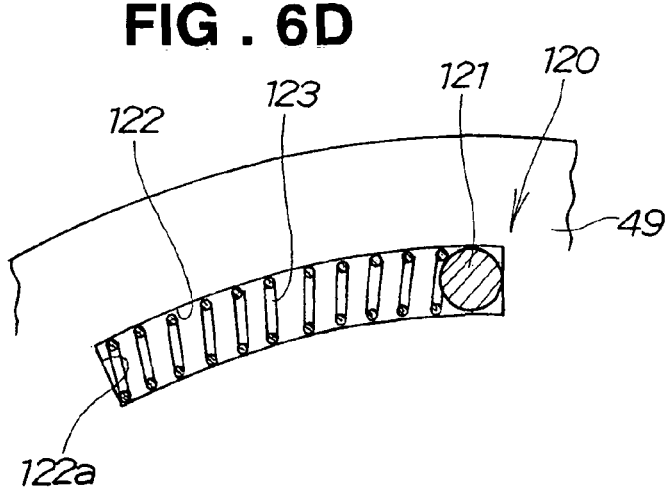

FIG. 6A through FIG. 6C show the phase holding mechanism 120 according to the present invention. FIG. 6D shows a modification to the phase holding mechanism 120.

As shown in FIG. 5 and FIG. 6A through FIG. 6C, the phase holding mechanism 120 includes a round bar-shaped pin 121 projecting from a top surface of the torque-transmitting worm wheel 48, an elongated hole 122 formed to vertically extend though the auxiliary worm wheel 49 for fitting engagement with the pin 121, and a compression spring 123 serving as a resilient member and interposed between one end 122a of the elongated hole 122 and the pin 121.

The elongated hole 122 is a through hole taking the form of an arc of a circle concentric with the auxiliary worm wheel 49 having the rotational center CL. The elongated hole 122 is sized to accommodate the compression spring 123. The compression spring 123 urges the auxiliary worm wheel 49 in a direction of rotation relative to the torque-transmitting worm wheel 49.

The holding plate 91 lies over the auxiliary worm wheel 49 for preventing the compression spring 123 from escaping from the elongated hole 122. The holding plate 91 has an escape hole 91a for allowing a tip end of the pin 121 to escape thereinto.

The elongated hole 122 may have flat one end 122a, as shown in FIG. 6D.

Figure 7:
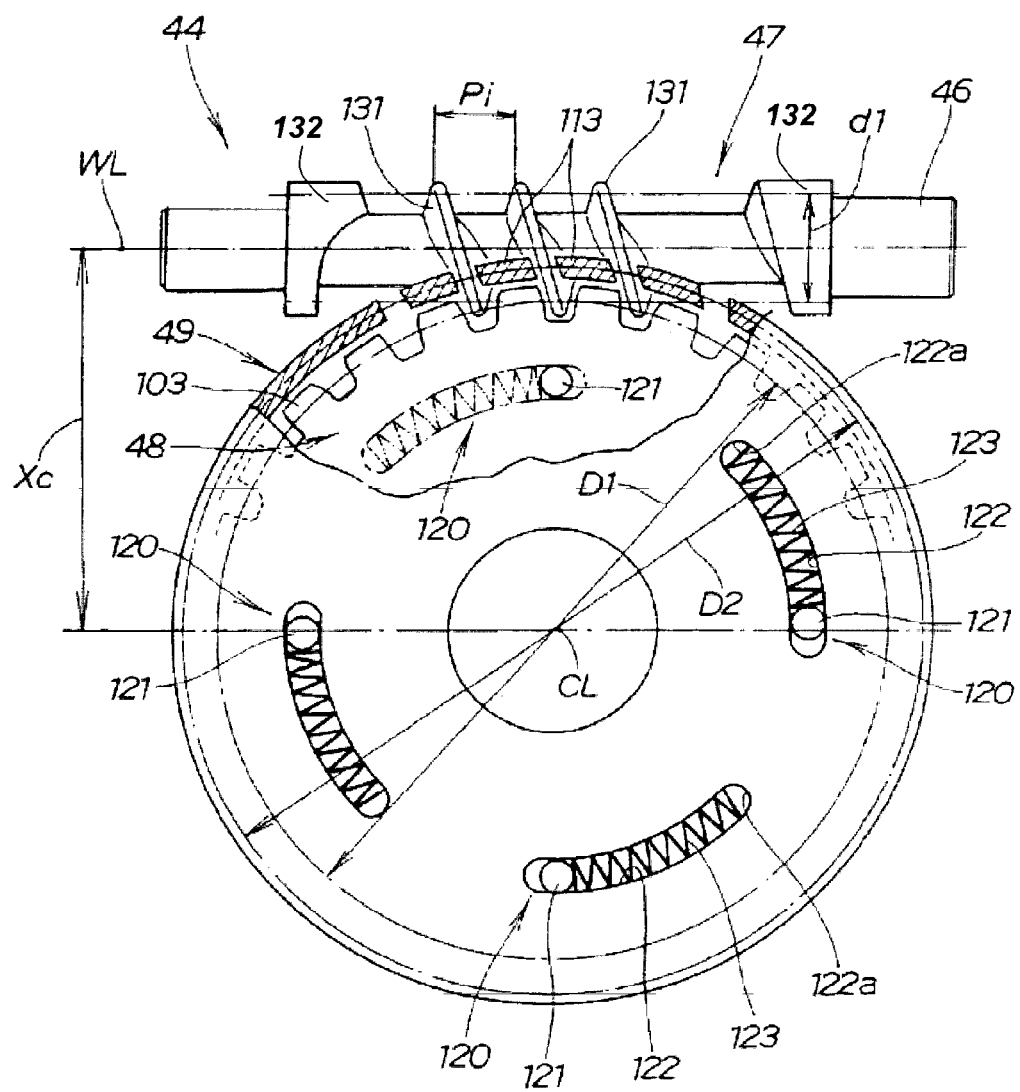
FIG. 7 is a plan view of the worm gear mechanism according to the one embodiment of the present invention.

FIG. 7 is a plan view of the worm gear mechanism 44 according to one embodiment of the present invention, showing partly in cross-section the auxiliary worm wheel 49. The auxiliary worm wheel 49 has a pitch circle of a diameter D2 set to be greater than a diameter D1 of a pitch circle of the torque-transmitting worm wheel 48 (D1<D2). The auxiliary worm wheel 49 meshes with the worm 47.

FIG. 7 shows the worm 47 including a large-diameter cylindrical portion 132 having an outside diameter larger than a diameter at a root of the screw thread of the worm 47, the large-diameter cylindrical portion 132 being disposed at a position held out of interference with the torque-transmitting worm wheel 48 and the auxiliary worm wheel 49. FIG. 7 shows the large-diameter cylindrical portion 132 being disposed on axial opposite sides of the screw thread of the worm 47. FIG. 7 shows the outside diameter of the large-diameter cylindrical portion 132 being larger than a diameter d1 of a pitch circle of the worm 47 established when the worm 47 meshes with the auxiliary worm wheel 49.

The plural phase holding mechanisms 120 all have the same structure and are circumferentially arranged at equal pitches around the rotational center CL of the auxiliary worm wheel 49.

The worm 47 is a metal product, for example, a steel product such as a carbon steel for machine structural use (JIS-G-4051).

The torque-transmitting worm wheel 48 and the auxiliary worm wheel 49 are resin products made from nylon resin and the like. The metal product (that is, the worm 47) can relatively smoothly mesh with the resin products (that is, the torque-transmitting worm wheel 48 and the auxiliary worm wheel 49). This smooth meshing engagement between the metal product and the resin products makes a reduced noise.

The tooth 131 of the worm 47 has a generally trapezoidal cross-section. The tooth 103 of the torque-transmitting worm wheel 48 is an involute tooth. The worm 47 has a single screw thread 131 providing a pitch Pi.

There is provided a distance Xc between the center CL of the torque-transmitting worm wheel 48 and a center WL of the worm 47. The distance Xc between the centers CL, WL are expressed by the following Equation (1):

$$Xc=(D1+d1)/2 \quad (1)$$

where d1 denotes a diameter of a pitch circle of the worm 47 meshing with the torque-transmitting worm wheel 48.

Figure 8:
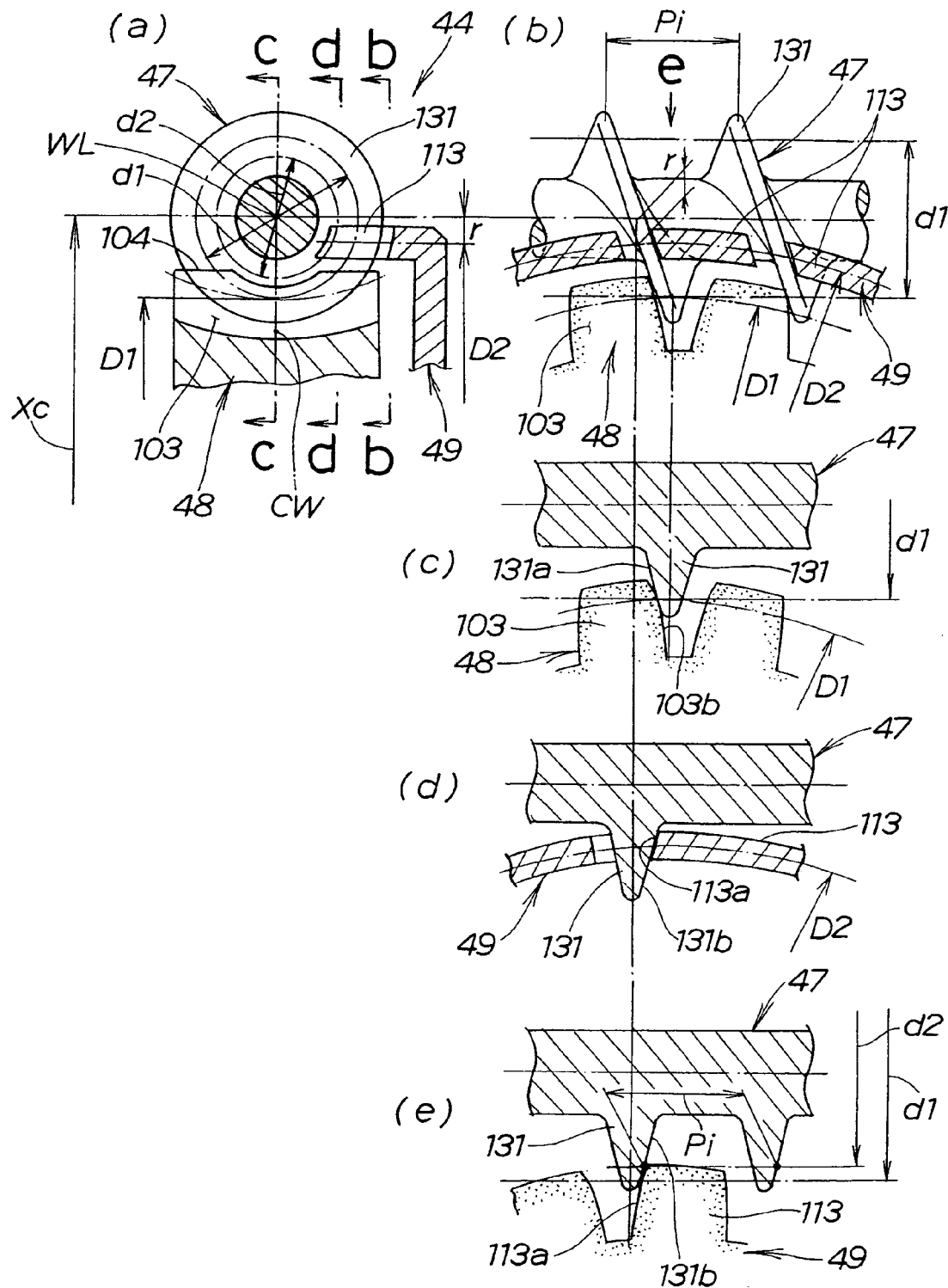
FIG. 8 is a view showing meshing engagements of a worm with a torque-transmitting worm wheel and an auxiliary worm wheel, the worm, the torque-transmitting worm wheel and the auxiliary worm wheel being shown in FIG. 7.

(a) of FIG. 8 through (e) of FIG. 8 show the arrangement of the afore-mentioned worm gear mechanism according to the one embodiment of the present invention. (a) of FIG. 8 shows a cross-section of the worm gear mechanism 44 in correspondence to FIG. 3. (b) of FIG. 8 is a cross-sectional view taken along line b-b of (a) of FIG. 8. (c) of FIG. 8 is a cross-sectional view taken along line c-c of (a) of FIG. 8. (d) of FIG. 8 is a cross-sectional view taken along line d-d of (a) of FIG. 8. (e) of FIG. 8 is a cross-sectional view of the worm 47 and the auxiliary worm wheel 49 as viewed in a direction of an arrow indicated by a reference character e of (b) of FIG. 8.

As shown in (a) of FIG. 8 and (b) of FIG. 8, the crown-shaped auxiliary worm wheel 49 lies over the torque-transmitting worm wheel 48 and meshes with the worm 47, with the plurality of teeth 113 of the auxiliary worm wheel 49 surrounding an outer peripheral surface 104 of the torque-transmitting worm wheel 48. This arrangement eliminates the possibility that the teeth 113 of the auxiliary worm wheel 49 interfere with the torque-transmitting worm wheel 48.

Because the diameter D2 of the pitch circle of the auxiliary worm wheel 49 is set to be greater than the diameter D1 of the pitch circle of the torque-transmitting worm wheel 48, the auxiliary worm wheel 49 meshes with the worm 47 in a different meshing phase (or at a different position in a circumferential direction of the auxiliary worm wheel 49) from the torque-transmitting worm wheel 48. With this arrangement, the face width of the tooth of the torque-transmitting worm wheel 48 can be sufficiently large (for example, the face width can be set to be substantially equal to an outer diameter of the worm 47). Therefore, the tooth 103 of the torque-transmitting worm wheel 48 has a sufficient contact area for contacting the tooth 131 of the worm 47, whereby the worm gear mechanism 44 provides an improved durability.

There is provided a distance r between the center of the worm 47 and the pitch circle of the auxiliary worm wheel 49. The distance r is expressed by the following Equation (2):

$$r=(D1+d1-D2)/2 \quad (2)$$

The distance r is an optionally selected value, preferably, zero. More specifically, the diameter D2 of the pitch circle may be set such that the teeth 113 of the auxiliary worm wheel 49 do not interfere with the torque-transmitting worm wheel 48 and the auxiliary worm wheel 49 meshes with the worm 47.

As discussed above, the auxiliary worm wheel 49 is formed into the crown-shaped configuration with the plural teeth 113 of the auxiliary worm wheel 49 surrounding the outer peripheral surface 104 of the torque-transmitting worm wheel 48. Thus, addition of the auxiliary worm wheel 49 to the torque-transmitting worm wheel 48 can be effected without the auxiliary worm wheel 49 interfering with the torque-transmitting worm wheel 48. With this arrangement, the face width of the tooth of the torque-transmitting worm wheel 48 can be set to be sufficiently large. Therefore, the tooth 103 of the torque-transmitting worm wheel 48 has a sufficient contact area for contacting the tooth 131 of the worm 47 with the result that the worm gear mechanism 44 has an improved durability.

Additionally, a diameter d2 of a pitch circle of the worm 47 obtained when the worm 47 meshes with the auxiliary worm wheel 49 is set to be smaller than a diameter d1 of a pitch circle of the worm 47 obtained when the worm 47 meshes with the torque-transmitting worm wheel 48 (d1>d2).

The diameter d2 of the pitch circle of the worm 47 obtained when the worm 47 meshes with the auxiliary worm wheel 49 is set to be made small relative to the constant pitch Pi of the screw thread (the tooth) 131 of the worm 47. This means that a lead angle of the screw thread 131 is increased by an amount by which the diameter d2 is reduced. The increase in the lead angle reduces a friction loss between the worm 47 and the auxiliary worm wheel 49. The reduction in the friction loss enables the worm 47 to rotate the auxiliary worm wheel 49 with a small force. With this arrangement, the worm gear mechanism 44 can be operated more smoothly, thereby providing a further improved durability thereof.

(c) of FIG. 8 shows the meshing engagement between the worm 47 and the torque-transmitting worm wheel 48. The tooth 103 of the torque-transmitting worm wheel 48 has a right tooth face 103b abutting on a left tooth face 131a of the tooth 131 of the worm 47.

(d) of FIG. 8 and (e) of FIG. 8 show the meshing engagement between the worm 47 and the auxiliary worm wheel 49. The tooth 113 of the auxiliary worm wheel 49 has a left tooth face 113a abutting on a right tooth face 131b of the tooth 131 of the worm 47.

Figure 9:
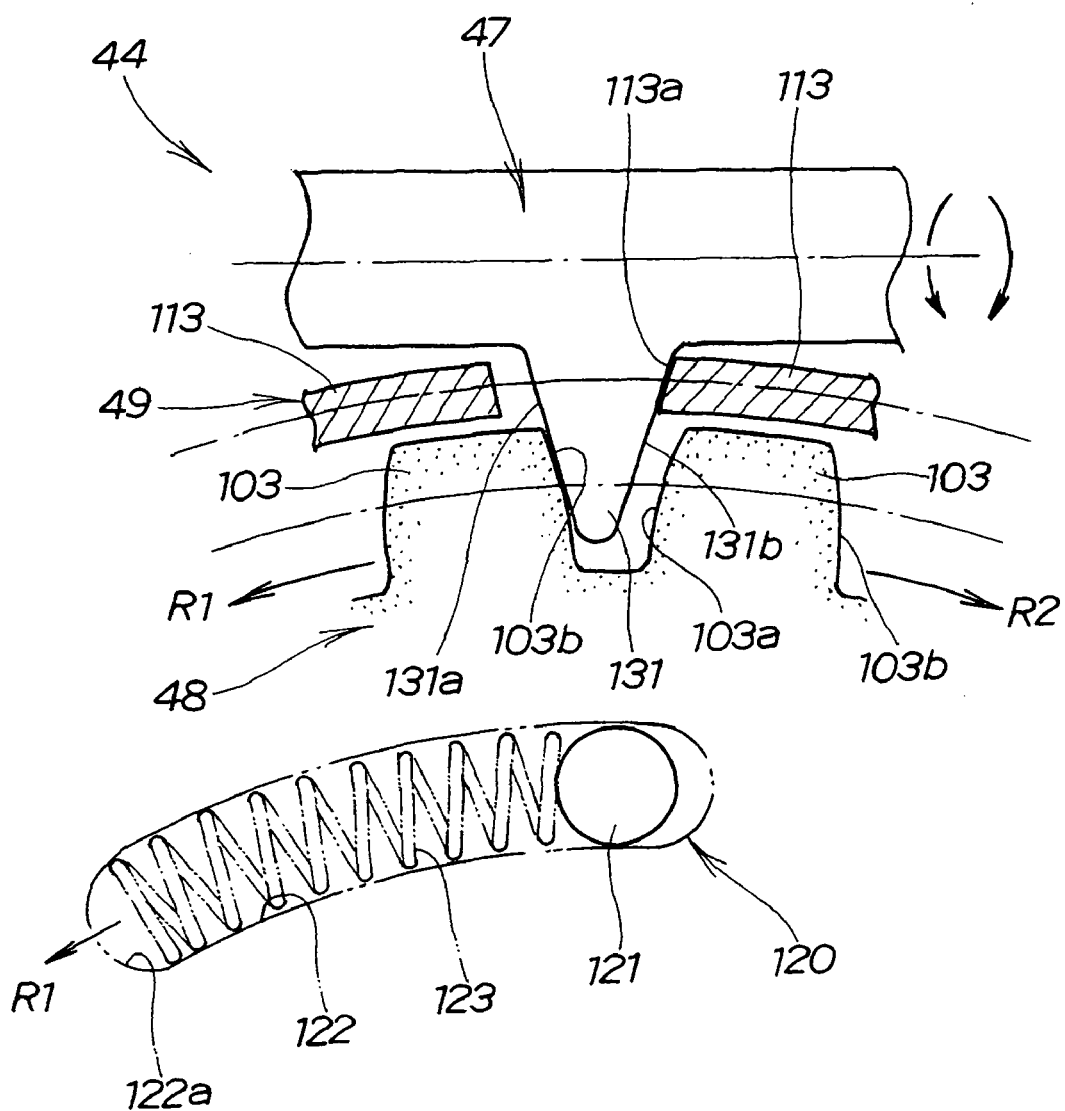
FIG. 9 is a view showing a relation between the phase holding mechanism and the meshing engagement of the worm with the torque-transmitting worm wheel and the auxiliary worm wheel.

FIG. 9 diagrammatically shows the meshing engagement shown in (c) of FIG. 8 and the meshing engagement shown in (d) of FIG. 8.

The torque-transmitting worm wheel 48 and the auxiliary worm wheel 49 mesh with the worm 47 with the tooth 131 of the worm 47 sandwiched between the tooth 103 of the torque-transmitting worm wheel 48 and the tooth 113 of the auxiliary worm wheel 49. The compression spring 123 (the resilient member 123) urges the auxiliary worm wheel 49 relative to the torque-transmitting worm wheel 48 in such a direction (as indicated by an arrow R1) as to maintain the tooth 131 in the sandwiched state.

The compression spring 123 interposed between the pin 121 erected from the torque-transmitting worm wheel 48 and the one end 122a of the elongated hole 122 formed in the auxiliary worm wheel 49 urges the auxiliary worm wheel 49 in the direction as indicated by the arrow R1 relative to the torque-transmitting worm wheel 48. Under a resilient force of the compression spring 123 exerted on the auxiliary worm wheel 49, the tooth 131 of the worm 47 is maintained in a neutral state in which the tooth 131 is sandwiched between the left tooth 103 of the torque-transmitting worm wheel 48 disposed leftward of the tooth 131 and the right tooth 113 of the auxiliary worm wheel 49 disposed rightward of the tooth 131.

With this arrangement, any backlash is eliminated between the worm 47 and the torque-transmitting worm wheel 48 and between the worm 47 and the auxiliary worm wheel 49.

Referring to FIG. 9, the tooth 131 of the worm 47 engages a tooth space (between the left tooth 103 and the right tooth 103) of the torque-transmitting worm wheel 48 with a slight backlash (gap) formed between the tooth 131 of the worm 47 and the right tooth 103 of the torque-transmitting worm wheel 48.

In this state shown in FIG. 9, when the worm 47 undergoes forward rotation, the tooth 131 of the worm 47 pushes the right tooth face 103b of the left tooth 103 of the torque-transmitting worm wheel 48 in the direction of the arrow R1 (in the counterclockwise direction) for revolution of the tooth 103. At this time, no hitting sound is produced between the tooth 103 and the tooth 131.

The auxiliary worm wheel 49 is caused to rotate together with the torque-transmitting worm wheel 48 by means of the phase holding mechanisms 120.

In the state shown in FIG. 9, when the worm 47 undergoes reverse rotation, the tooth 131 of the worm 47 pushes the left tooth face 113a of the tooth 113 of the auxiliary worm wheel 49 against the resilient force of the compression spring 123 in a direction of an arrow R2 (in the clockwise direction) for revolution of the tooth 113.

When the auxiliary worm wheel 49 is shifted in the direction of the arrow R2 through a given angle corresponding to the backlash between the tooth 103 and the tooth 131, the right tooth face 131b of the tooth 131 of the worm 47 strikes a left tooth face 103a of the right tooth 103 of the torque-transmitting worm wheel 48.

More specifically, the tooth 131 of the worm 47 gently strikes the tooth 103 of the torque-transmitting worm wheel 48 while pushing the tooth 113 of the auxiliary worm wheel 49 against the resilient force of the compression spring 123. Therefore, a strike sound between the tooth 131 and the tooth 103 is little.

When the worm 47 undergoes further reverse rotation, the torque-transmitting worm wheel 48 rotates in the direction of the arrow R2. The auxiliary worm wheel 49 rotates together with the torque-transmitting worm wheel 48.

The magnitude of the resilient force of the compression spring (the resilient member 123) may be properly set.

It therefore becomes possible to reduce the strike sound between the teeth 131, 103 of the worm 47 and the torque-transmitting worm wheel 48.

When the worm 47 is axially viewed as shown in (a) of FIG. 8, the left and right parts of the tooth 103 of the torque-transmitting worm wheel 48 are disposed in a direction of the face width of the tooth 103 and are symmetrically disposed relative to a point of meshing engagement of the worm wheel 48 with the worm 47 (that is, relative to a center line CW passing through a center WL of the worm 47 shown in (a) of FIG. 8).

The torque-transmitting worm wheel 48 is integrally molded because the tooth 103 of the torque-transmitting worm wheel 48 need not have any retention groove for retaining backlash-eliminating components as found in the prior art. Thus, the tooth 103 of the torque-transmitting worm wheel 48 can be worked with increased precision while the torque-transmitting worm wheel 48 can maintain a satisfactory meshing engagement with the worm 47.

When the torque-transmitting worm wheel 48 is caused to rotate in the direction of the arrow R2 by the reverse rotation of the worm 47, there is formed a slight backlash between the tooth 131 of the worm 47 and the left tooth 103 of the torque-transmitting worm wheel 48. When the worm 47 undergoes the forward rotation thereafter, there would be usually produced a strike sound between the teeth 131, 103.

In the one embodiment of the present invention, the resilient force of compression spring 123 has a magnitude set to reduce or suppress strike sounds made between the teeth 131, 103 when a large assist torque is required to operate the electric power steering apparatus 10 (FIG. 1), e.g., to steer when a vehicle is completely stopped (so-called still-steering), and to cause the vehicle to run at a low speed. Because the large assist torque is required, the compression spring 123 provides a relatively large resilient force.

Discussion will be made as to arrangement of the worm 47 with reference to FIGS. 7, 8, 10 and 11.

Figure 10:
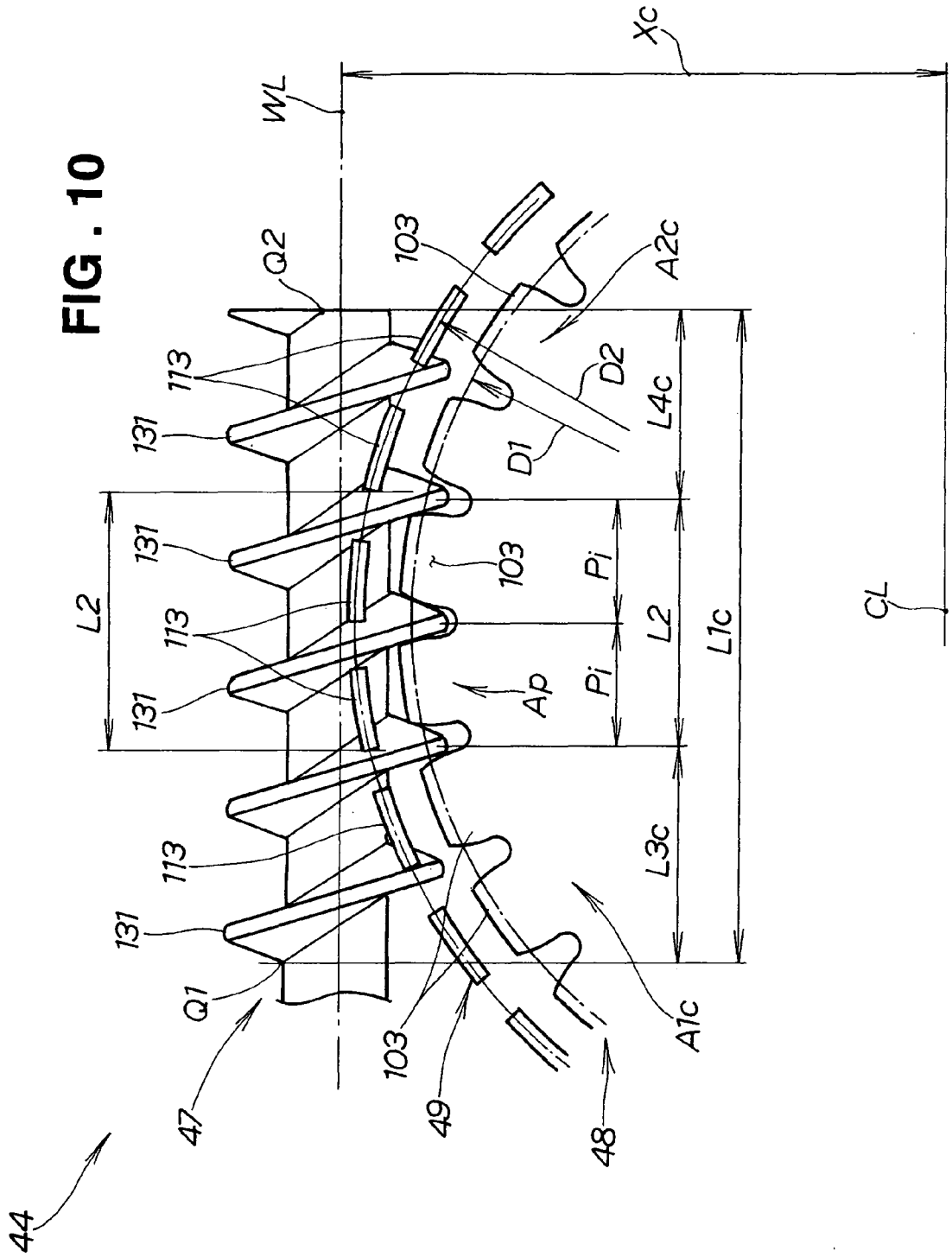
FIG. 10 is a plan view of a worm gear mechanism in a comparative example.
Figure 11:
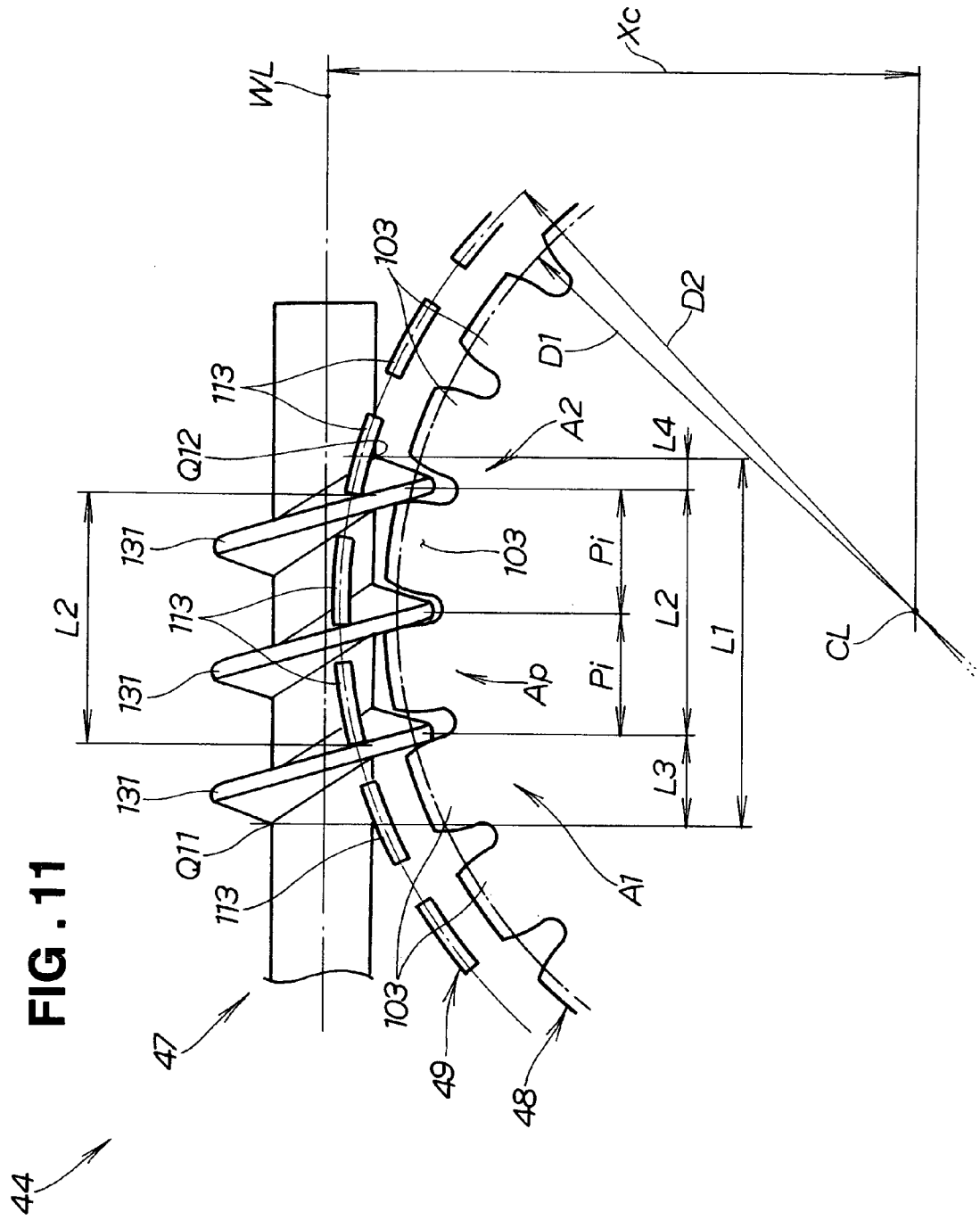
FIG. 11 is a plan view of the worm gear mechanism according to the one embodiment of the present invention.

FIG. 10 shows a worm gear mechanism 44 in a comparative example while FIG. 11 shows the worm gear mechanism 44 according to the one embodiment of the present invention.

As shown in (a) FIG. 8, the worm 47 meshes with the torque-transmitting worm wheel 48 in a known manner. Namely, when the worm 47 is axially viewed, the screw thread 131 of the worm 47 meshes with the tooth 103 of the torque-transmitting worm wheel 48 at a point positioned on the center line CW passing through the center WL of the worm 47. The torque-transmitting worm wheel 48 has a radius (which is one-half of the diameter D1) of the pitch circle thereof. The radius of the pitch circle of the torque-transmitting worm wheel 48 is smaller than a distance Xc between the center WL of the worm 47 and the center CL of the torque-transmitting worm wheel 48.

Although a screw thread 131 provided on a worm 47 in the comparative example has its large entire length L1c, all teeth 103 of a torque-transmitting worm wheel 48 can properly, smoothly mesh with the screw thread 131, as shown in FIG. 10. Thus, a frictional resistance produced when each tooth 103 meshes with the screw thread 131 does not increase due to a point of meshing engagement between the tooth 103 and the screw thread 131.

An auxiliary worm wheel 49 has the same center CL as the torque-transmitting worm wheel 48. A diameter D2 of a pitch circle of the auxiliary worm wheel 49 is larger than a diameter D1 of a pitch circle of the torque-transmitting worm wheel 48. The auxiliary worm wheel 49 meshes with the worm 47 in a meshing phase different from that of the torque-transmitting worm wheel 48.

The entire length L1c of the screw thread (the tooth) 131 provided on the worm 47 in the comparative example includes a length L2 referred to as "actual meshing length L2" along which the screw thread 131 actually meshes with the teeth 103 of the torque-transmitting worm wheel 48. Also, a part having the actual meshing length L2 is referred to as "actual meshing area Ap". The actual meshing length L2 is, for example, on the order of a value twice a pitch Pi of the screw thread 131. The screw thread 131 actually meshes with the teeth 113 of the auxiliary worm wheel 49 along the same length as the actual meshing length L2.

The worm 47 in the comparative example has non-meshing areas A1c, A2c where the screw thread 131 does not actually mesh with the teeth 103 of the torque-transmitting worm wheel 48. The entire length L1c of the screw thread 131 includes lengths L3c, L4c of the non-meshing areas A1c, A2c. The non-meshing areas A1c, A2c are located on axially both sides of the actual meshing area Ap located centrally of the worm 47.

For example, the non-meshing area A1c has the length L3c in the order of 1.75 times the pitch Pi of the screw thread 131 while the other non-meshing area A2c has the length L4c in the order of 1.5 times the pitch Pi of the screw thread 131. Therefore, the entire length L1c of the screw thread 131 is in the order of a value 5.25 times the pitch Pi of the screw thread 131.

The actual meshing area Ap provides a proper meshing engagement (a proper contact) between the tooth face of the screw thread 131 and a tooth face of each tooth 113 of the auxiliary worm wheel 49. However, it is difficult for the non-meshing areas A1c, A2c to assure a proper meshing engagement between the tooth face of the screw thread 131 and a tooth face of each tooth 113 of the auxiliary worm wheel 49. The closer to ends Q1, Q2 of the screw thread 131 points of meshing engagement between the teeth of the auxiliary worm wheel 49 and the screw thread 131 of the worm 47 are, the greater the difficulty of assuring the proper meshing engagement becomes. This is because change in the point at which the tooth 113 of the auxiliary worm wheel 49 meshes with the screw thread 131 greatly changes an angle at which the tooth face of the tooth 113 of the auxiliary worm wheel 49 contacts the tooth face of the screw thread 131.

In a case where the entire length L1c of the screw thread 131 provided on the worm 47 is large as shown in the comparative example of FIG. 10, part of the teeth 113 of the auxiliary worm wheel 49 does not necessarily provide the optimal meshing engagement with the screw thread 131 of the worm 47. If the teeth 113 can not smoothly mesh with the screw thread 131, a large frictional resistance is unavoidably provided upon the meshing engagement.

Turning to FIG. 11 showing the worm 47, the torque-transmitting worm wheel 48 and the auxiliary worm wheel 49 in the one embodiment of the present invention, the entire length L1 of the screw thread 131 is reduced to be approximately equal to the actual meshing length L2.

More specifically, the screw thread 131 provided on the worm 47 has the entire length designated at L1. The entire length L1 includes a length L2 referred to as "actual meshing length L2" along which the screw thread 131 actually meshes with the teeth 103 of the torque-transmitting worm wheel 48. The actual meshing length L2 in the one embodiment of the present invention is the same as that in the comparative example of FIG. 10. The screw thread 131 actually meshes with the teeth 113 of the auxiliary worm wheel 49 along the same length as the actual meshing length L2. A part having the actual meshing length L2 is referred to as "actual meshing area Ap". The actual meshing area Ap in the one embodiment of the present invention is the same as that in the comparative example of FIG. 10.

The worm 47 in the one embodiment of the present invention has non-meshing areas A1, A2 where the screw thread 131 does not actually mesh with the teeth 103, 103 of the torque-transmitting worm wheel 48. The entire length L1 of the screw thread 131 includes lengths L3, L4 of the non-meshing areas A1, A2. The non-meshing areas A1, A2 are located on axially both sides of the actual meshing area Ap located centrally of the worm 47. More specifically, the non-meshing areas A1, A2 of the worm 47 are located on axially both sides of the worm 47. The non-meshing areas A1, A2 have the lengths L3, L4 which are rendered as small as possible for rendering the entire length L1 of the screw thread 131 so small that the entire length L1 of the screw thread 131 is approximately equal to the actual meshing length L2.

Since the auxiliary worm wheel 49 is an auxiliary toothed wheel provided for eliminating any backlash between the worm 47 and the torque-transmitting worm wheel 48, it is only necessary that at least one tooth 113 of the auxiliary worm wheel 49 can mesh with the screw thread 131.

Thus, the lengths L3, L4 of the non-meshing areas A1, A2 can be each set to be substantially zero for making the entire length L1 of the screw thread 131 equal to the actual meshing length L2, however, it is preferred that the entire length L1 of the screw thread 131 be slightly greater than the actual meshing length L2, taking account of: (1) a precision with which the torque-transmitting worm wheel 48 and the auxiliary worm wheel 49 are assembled with the worm 47; and (2) an error produced in working the torque-transmitting worm wheel 48 and the auxiliary worm wheel 49. In the present invention, therefore, the entire length L1 of the screw thread 131 is set to be approximately equal to the actual meshing length L2.

Especially, it is preferred that the length L4 of the non-meshing area A2 where the tooth face of the tooth 113 of the auxiliary worm wheel 49 contacts the tooth face of the screw thread 131 be made as small as possible.

For example, the length L3 of the non-meshing area A1 is in the order of one half of the pitch Pi of the screw thread 131 while the length L4 of the non-meshing area A2 is in the order of 0.25 times the pitch Pi of the screw thread 131. Thus, the entire length L1 of the screw thread 131 is in the order of 2.75 times the pitch Pi of the screw thread 131.

From the foregoing, the worm gear mechanism 44 in the one embodiment of the present invention is designed to reduce the entire length L1 of the screw thread 131 by setting the entire length L1 of the screw thread 131 to be approximately equal to the actual meshing length L2. The setting of the reduced entire length L1 of the screw thread 131 provides a reduced area where the teeth 113 of the auxiliary worm wheel 49 mesh with the screw thread 131.

With this arrangement, while revolving along with the rotational movement of the torque-transmitting worm wheel 48, the teeth 113 of the auxiliary worm wheel 49 mesh with the screw thread 131 of the worm 47, with the tooth face of each of the teeth 113 contacting the tooth face of the screw thread at a proper angle, without interfering with the other teeth 113.

Accordingly, when one of the plural teeth 113 of the auxiliary worm wheel 49 meshes with the screw thread 131, it becomes possible to prevent the other teeth 113 from interfering with the screw thread 131. Because the smooth meshing engagement can be achieved, a frictional resistance produced upon the smooth meshing engagement can be reduced. Therefore, the electric power steering apparatus 10 can provide an improved steering feeling.

As is apparent from the above discussion, the entire length L1 of the screw thread 131 provides a range where or is an effective length along which the screw thread 131 meshes with the teeth 113 of the auxiliary worm wheel 49 with the tooth face of the screw thread 131 contacting the tooth faces of the teeth 113 of the auxiliary worm wheel 49 at proper angles. In this range, it becomes possible to prevent the teeth 113 of the auxiliary worm wheel 49 from interfering with the screw thread 131. Thus, the entire length L1 can be referred to as "effective length L1".

A modified worm gear mechanism 44A according to another embodiment of the present invention will be described in relation to FIG. 12. The same components of the mechanism 44A as those shown in FIG. 11 will be numbered by the same reference numerals and their explanations will be omitted. The modified worm gear mechanism 44A has the same arrangement as that shown in FIGS. 1 to 9 and hence further figures for showing such an arrangement of the mechanism 44A are omitted.

Figure 12:
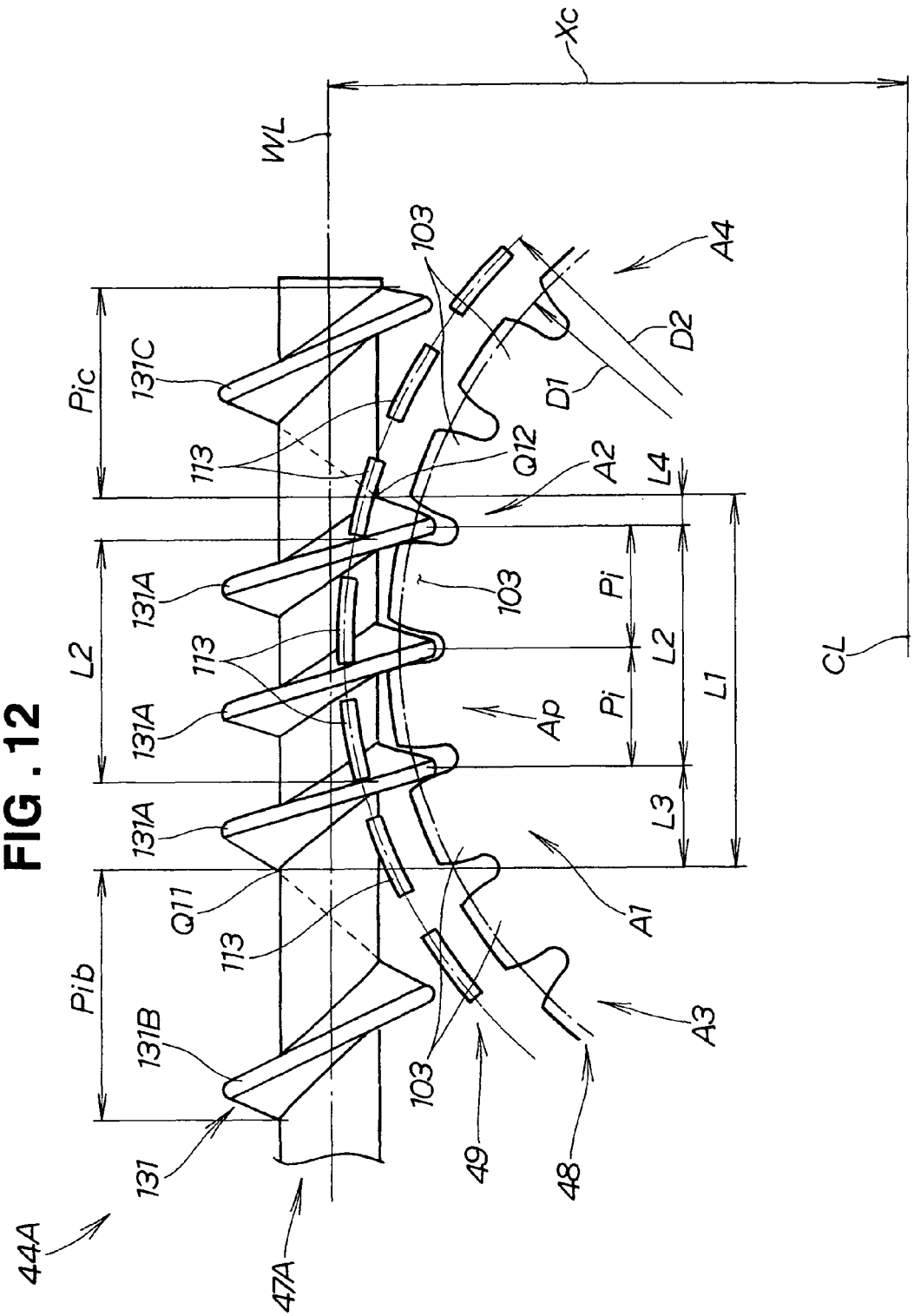
FIG. 12 is a plan view of a modified worm gear mechanism according to another embodiment of the present invention.
Figure 13A:
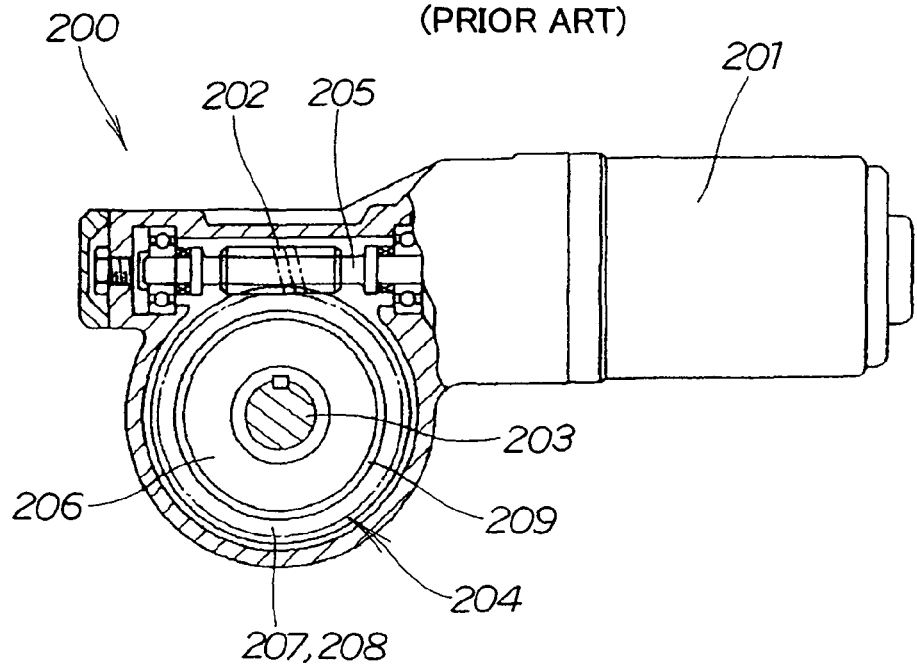
FIG. 13A through FIG. 13C are schematic views of a prior art worm gear mechanism.
Figure 13B:
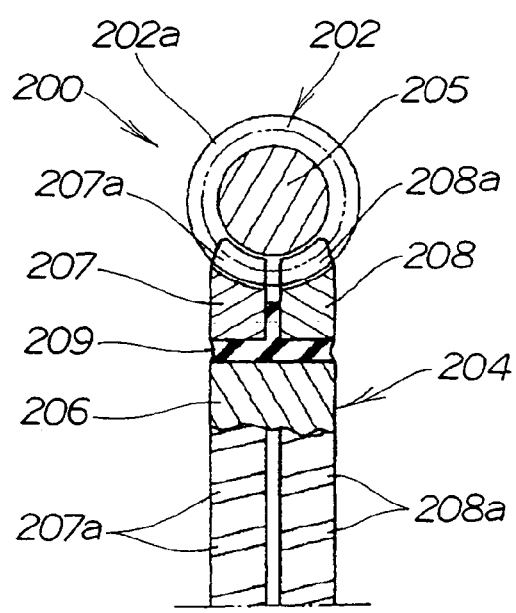
Figure 13C:
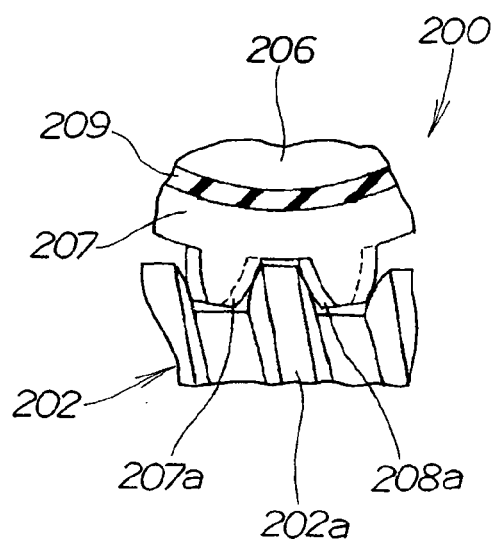
Figure 14A:
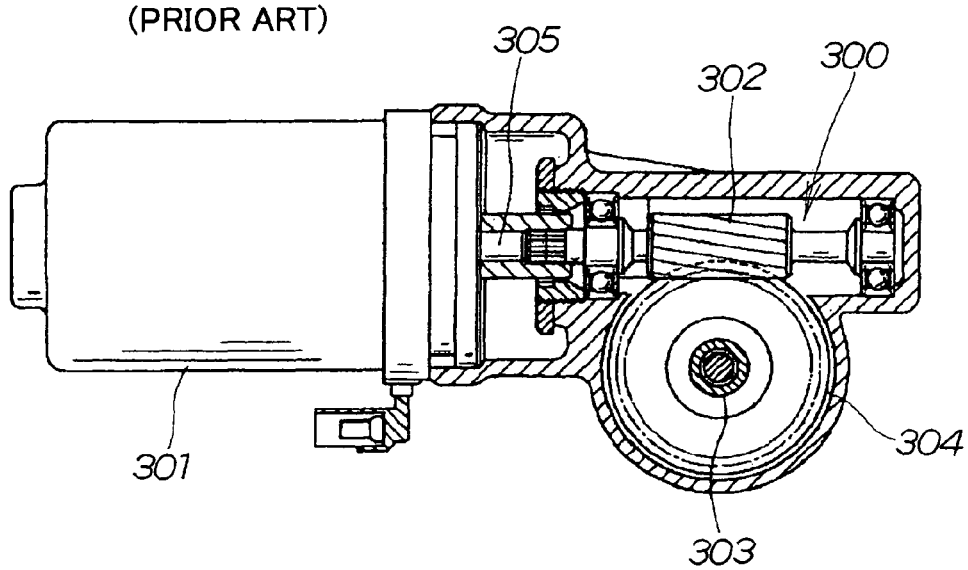
FIG. 14A and FIG. 14B are views showing another prior art worm gear mechanism.
Figure 14B:
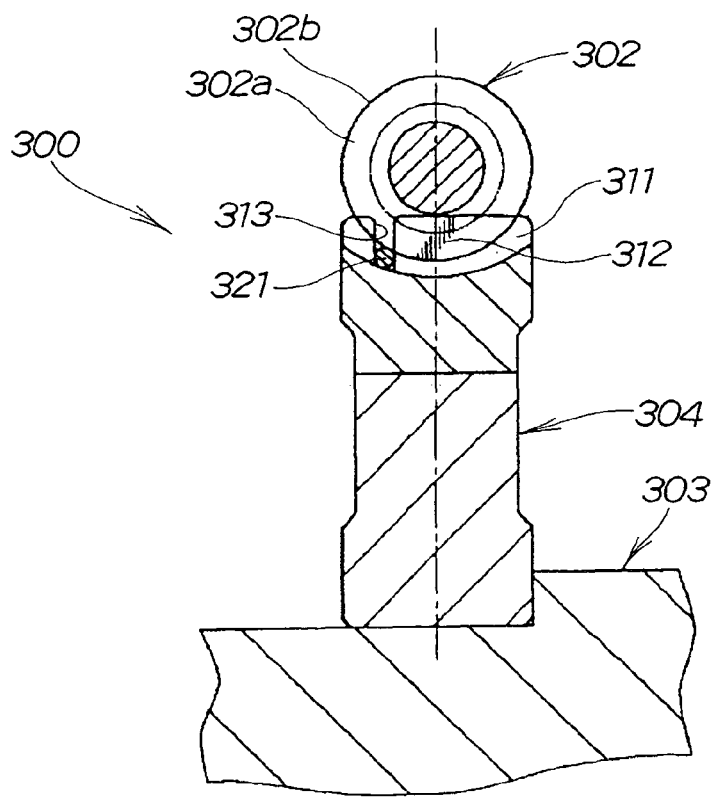

The modified worm gear mechanism 44A shown in FIG. 12 includes a worm 47A having a screw thread 131 provided thereon. The screw thread 131 includes a portion 131A actually meshing with the teeth 103 of the torque-transmitting worm wheel 48, and portions 131B, 131C not meshing with any tooth 103 of the torque-transmitting worm wheel 48. The portions 131B, 131C of the screw thread 131 have pitches Pib, Pic greater than a pitch Pi of the portion 131A.

More specifically, the portion 131A of the screw thread 131 provided on the worm 47 and having the pitch Pi has one end Q11 and the opposite end Q12 spaced from each other by a distance L1 defining the entire length of the portion 131A, as in the case of the embodiment shown in FIG. 11. The entire length L1 of the portion 131A of the screw thread 131 includes a length L2 referred to as "actual meshing length L2" along which the portion 131A actually meshes with the teeth 103 of the torque-transmitting worm wheel 48. The actual meshing length L2 is the same as that shown in FIG. 11. The screw thread 131 actually meshes with the teeth 113 of the auxiliary worm wheel 49 along the same length as the actual meshing length L2. A part having the actual meshing length L2 is referred to as "actual meshing area Ap". The actual meshing area Ap of the worm 47A is the same as that shown in FIG. 11.

The worm 47A of the modified worm gear mechanism 44A has non-meshing areas A1, A2 where the screw thread 131A does not actually mesh with any tooth 103 of the torque-transmitting worm wheel 48. The entire length L1 of the portion 131A of the screw thread 131 includes lengths L3, L4 of the non-meshing areas A1, A2. The non-meshing areas A1, A2 are located on axially both sides of the actual meshing area Ap located centrally of the worm 47A. The entire length L1 of the portion 131A of the screw thread 131 are rendered small by the lengths L3, L4 of the non-meshing areas A1, A2 being made as small as possible. Therefore, the entire length L1 of the portion 131A can be set to be approximately equal to the actual meshing length L2.

The lengths L3, L4 of the non-meshing areas A1, A2 are the same as those shown in FIG. 11. It is preferred that the entire length L1 of the portion 131A of the screw thread 131 be equal to the actual meshing length L2 with the lengths L3, L4 set to zero. However, the entire length L1 of the portion 131A of the screw thread 131 is slightly greater than the actual meshing length L2, taking account of: (1) a precision with which the torque-transmitting worm wheel 48 and the auxiliary worm wheel 49 are assembled with the worm 47; and (2) an error produced in working the worm wheels 48, 49. As for the modified worm gear mechanism 44A, therefore, the entire length L1 of the portion 131A of the screw thread 131 is set to be approximately equal to the actual meshing length L2.

The worm 47A of the modified worm gear mechanism 44A further includes a tooth escaping area A3 located on an axially one side of the non-meshing area A1, and a tooth escaping area A4 located on an axially one side of the non-meshing area A2.

The tooth escaping area A3 is located adjacent the non-meshing area A1 and has the portion 131B continuous with the one end Q11 of the portion 131A. The portion 131B of the screw thread 131 has the pitch Pib. The tooth escaping area A4 is located adjacent the non-meshing area A2 and has the portion 131C continuous with the opposite end Q12 of the portion 131A. The portion 131C has the pitch Pic.

As is apparent form from FIG. 12, the portions 131B, 131C of the screw thread 131 do not mesh with any tooth 103 of the torque-transmitting worm wheel 48. The pitches Pib, Pic of the portions 131B, 131C of the screw thread 131 are greater than the pitch Pi of the portion 131A. It is optional to set the pitches Pib, Pic to be equal to or different from each other. The pitches Pi, Pib, Pic of the screw thread 131 provided on the worm 47A of the modified worm gear mechanism 44A are not equal to each other.

The non-meshing areas A1, A2 may be eliminated. In such a case, located on the axially both sides of the actual meshing area Ap located centrally of the worm 47 are the tooth escaping areas A3, A4.

By setting the large pitches Pib, Pic of the portions 131B, 131C not actually meshing with any tooth 103 of the torque-transmitting worm wheel 48, the portions 131B, 131C not meshing with any tooth 103 of the torque-transmitting worm wheel 48 do not mesh with any tooth 113 of the auxiliary worm wheel 49, either.

With this arrangement, while revolving together with the rotational movement of the torque-transmitting worm wheel 48, the teeth 113 of the auxiliary worm wheel 49 mesh with the screw thread 131 in such a small area as not to interfere with the other teeth 113. More specifically, in this small area where the teeth 113 of the auxiliary worm wheel 49 mesh with the screw thread 131, the tooth face of each of the teeth 113 contact the tooth face of the screw thread 131 at a proper angle. When one of the teeth 113 of the auxiliary worm wheel 49 meshes with the screw thread 131, it becomes possible to prevent the other teeth 113 from interfering with the screw thread 131. Since the teeth 113 can smoothly mesh with the screw thread 131, a frictional resistance produced upon the smooth meshing engagement can be reduced. Because the screw thread 131 is formed along the overall length of the worm 47, the worm 47 has an increased flexural rigidity throughout, and the satisfactory meshing engagement between the worm 47 and the torque-transmitting worm wheel 48 is achieved. Thus, the electric power steering apparatus 10 provides a further improved steering feeling.

In the worm gear mechanism 44 shown in FIG. 10 through FIG. 12, it is to be noted that the portions of the screw thread 131 not actually mesh with any tooth 103 of the torque-transmitting worm wheel 48 may have small "whole depth" (the overall height of the tooth) to thereby offer the same function and advantageous results as the arrangement shown in FIG. 11 or FIG. 12.

If the "whole depth" of the screw thread 131 is reduced to be equal to a deddendum or to be in flush with a bottom land, it becomes possible to reduce a meshing range where the teeth 113 of the auxiliary worm wheel 49 mesh with the screw thread 131.

For the worm gear mechanism 44 shown in FIG. 10, for example, by reducing the "whole depth" of the screw thread 131 in the non-meshing areas A1c, A2c having the lengths L3c, L4c, the actual meshing length L2 of the actual meshing area Ap is made "effective length L2".

The electric motor in the electric power steering apparatus may not be limited to having an arrangement for producing an assist torque corresponding to a detection signal indicative of a steering torque, but have any arrangement for producing a torque to be transmitted via the worm gear mechanism to the steering system.

The worm gear mechanism according to the present invention is suitable for a vehicular electric power steering apparatus in which the steering torque sensor detects a steeling torque produced by a steering wheel being turned, the electric motor produces an assist torque in correspondence to a detection signal from the steering torque sensor, and the worm gear mechanism transmits the assist torque to the steering system.

Obviously, various minor changes and modifications of the present invention are possible in the light of the above teaching. It is therefore to be understood that within the scope of the appended claims the invention may be practiced otherwise than as specifically described.

What is claimed is:

1. A worm gear mechanism, comprising:
   a worm on a drive side, the worm having a screw thread;
   a torque-transmitting worm wheel having first teeth for meshing with the screw thread of the worm to transmit a torque from the worm to a load side, said torque-transmitting worm wheel having an outer peripheral surface; and
   an auxiliary worm wheel disposed concentrically with the torque-transmitting worm wheel and having second teeth for meshing with the screw thread of the worm, said second teeth of the auxiliary worm wheel surrounding the outer peripheral surface of the torque-transmitting worm wheel and lying over the torque-transmitting worm wheel;
   wherein said screw thread of the worm has a length which is approximately equal to an actual meshing length in which the screw thread actually meshes with the first teeth of the torque-transmitting worm wheel, and further said screw thread actually meshes with the second teeth of the auxiliary worm wheel also only within the length which is approximately equal to said actual meshing length,
   the first teeth of the torque-transmitting worm wheel mesh at a first meshing portion of the screw thread of the worm,
   the second teeth of the auxiliary worm wheel mesh at a second portion of the screw thread of the worm,
   the second meshing portion is provided not to be in a plane extending from the first meshing portion in a direction of tooth width of the torque-transmitting worm wheel, and the second meshing portion is positioned radially outwardly of the first meshing portion.

2. The worm gear mechanism in accordance with claim 1, wherein the auxiliary worm wheel has a pitch circle diameter set such that the second teeth of the auxiliary worm wheel do not interfere with the torque-transmitting worm wheel when the auxiliary worm wheel meshes with the worm.

3. The worm gear mechanism in accordance with claim 1, wherein a diameter d2 of the worm where the worm intersects with a pitch circle D2 of the auxiliary worm wheel is less than a diameter d1 of the worm where the worm intersects with a pitch circle D1 of the torque-transmitting worm wheel.

4. The worm hear mechanism in accordance with claim 1, wherein said screw thread of the worm has an entire length which is equal to or greater than a length of said actual meshing area.

5. The worm gear mechanism in accordance with claim 1, further comprising a resilient member acting between the torque-transmitting worm wheel and the auxiliary worm wheel to resiliently urge them relative to each other in a circumferential direction to maintain a different phase of the auxiliary worm wheel from a phase of the torque-transmitting worm wheel and keep the screw thread of the worm sandwiched between one of the first teeth of the torque-transmitting worm wheel and an adjacent one of the second teeth of the auxiliary worm wheel.

6. The worm gear mechanism according to claim 1, wherein the auxiliary worm wheel has a pitch circle of a diameter greater than a diameter of a pitch circle of the torque-transmitting worm wheel.

7. The worm gear mechanism according to claim 1, wherein the auxiliary worm wheel includes a crown-shape gear, and the second teeth surround an outer peripheral end face of the crown-shape gear.

8. The worm gear mechanism according to claim 7, wherein the worm has a large-diameter cylindrical portion having an outside diameter larger than a diameter at a root of the screw thread of the worm, the large-diameter cylindrical portion being disposed at a position held out of interference with the torque-transmitting worm wheel and the auxiliary worm wheel,
   wherein the outside diameter of the large-diameter cylindrical portion is larger than a diameter of a pitch circle of the worm established when the worm meshes with the auxiliary worm wheel.

9. The worm gear mechanism according to claim 1, wherein the worm has a large-diameter cylindrical portion having an outside diameter larger than a diameter at a root of the screw thread of the worm, the large-diameter cylindrical portion being disposed at a position held out of interference with the torque-transmitting worm wheel and the auxiliary worm wheel.

10. The worm gear mechanism according to claim 9, wherein the large-diameter cylindrical portion is disposed on axial opposite sides of the screw thread of the worm.

11. The worm gear mechanism according to claim 10, wherein the outside diameter of the large-diameter cylindrical portion is larger than a diameter of a pitch circle of the worm established when the worm meshes with the auxiliary worm wheel.

12. A worm gear mechanism, comprising:
   a worm on a drive side, the worm having a screw thread;
   a torque-transmitting worm wheel having teeth for meshing with the screw thread of the worm to transmit a torque from the worm to a load side; and
   an auxiliary worm wheel disposed concentrically with the torque-transmitting worm wheel,
   wherein the auxiliary worm wheel has a pitch circle diameter set to be greater than a pitch circle diameter of the torque-transmitting worm wheel, the auxiliary worm wheel is brought into meshing engagement with the worm, and the screw thread of the worm includes a first part actually meshing with the teeth of the torque-transmitting worm wheel and a second part not meshing with the teeth of the torque-transmitting worm wheel, the second part of the screw thread having a pitch set to be larger than a pitch of the first part of the screw thread, the second part of the screw thread having a tooth space wider than a tooth space of the first part of the screw thread.

13. An electric power steering apparatus, comprising:
a worm gear mechanism;
a steering system spanning between a vehicular steering wheel and steered wheels;
an electric motor for producing a torque to be transmitted via the worm gear mechanism to the steering system;
the worm gear mechanism including:
a worm on a drive side, the worm having a screw thread;
a torque-transmitting worm wheel having first teeth for meshing with the screw thread of the worm to transmit a torque from the worm to a load side, said torque-transmitting worm wheel having an outer peripheral surface; and
an auxiliary worm wheel disposed concentrically with the torque-transmitting worm wheel and having second teeth for meshing with the screw thread of the worm, said second teeth of the auxiliary worm wheel surrounding the outer peripheral surface of the torque-transmitting worm wheel and lying over the torque-transmitting worm wheel,
wherein said screw thread of the worm has a length which is approximately equal to an actual meshing length in which the screw thread actually meshes with the first teeth of the torque-transmitting worm wheel, and further said screw thread actually meshes with the second teeth of the auxiliary worm wheel also only within the length which is approximately equal to said actual meshing length, the first teeth of the torque-transmitting worm wheel mesh at a first meshing portion of the screw thread of the worm,
the second teeth of the auxiliary worm wheel mesh at a second portion of the screw thread of the worm,
the second meshing portion is provided not to be in a plane extending from the first meshing portion in a direction of tooth width of the torque-transmitting worm wheel, and
the second meshing portion is positioned radially outwardly of the first meshing portion.

14. An electric power steering apparatus, comprising:
a worm gear mechanism;
a steering system spanning between a vehicular steering wheel and steered wheels;
an electric motor for producing a torque to be transmitted via the worm gear mechanism to the steering system;
the worm gear mechanism including:
a worm on a drive side, the worm having a screw thread;
a torque-transmitting worm wheel having teeth for meshing with the screw thread of the worm to transmit a torque from the worm to a load side; and
an auxiliary worm wheel disposed concentrically with the torque-transmitting worm wheel,
wherein the auxiliary worm wheel has a pitch circle diameter set to be greater than a pitch circle diameter of the torque-transmitting worm wheel, the auxiliary worm wheel is brought into meshing engagement with the worm, and the screw thread of the worm includes a first part actually meshing with the teeth of the torque-transmitting worm wheel and a second part not meshing with the teeth of the torque-transmitting worm wheel, the second part of the screw thread having a pitch set to be larger than a pitch of the first part of the screw thread, the second part of the screw thread having a tooth space wider than a tooth space of the first part of the screw thread.

* * * * *